United States Patent
Schwitters et al.

(10) Patent No.: US 6,606,649 B1
(45) Date of Patent: Aug. 12, 2003

(54) APPLICATION PROGRAMMING INTERFACE FUNCTIONS FOR SUPPORTING AN IMPROVED MESSAGE STORE FOR HAND-HELD COMPUTERS

(75) Inventors: Chad A. Schwitters, Redmond, WA (US); Roman Sherman, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/407,545

(22) Filed: Sep. 28, 1999

(51) Int. Cl.[7] .............................................. G06F 15/16
(52) U.S. Cl. ...................... 709/206; 709/203; 709/207; 709/218; 707/10
(58) Field of Search ................................. 709/200–203, 709/206–207, 217–218, 224, 100–101, 310–312; 707/2, 10

(56) References Cited

U.S. PATENT DOCUMENTS

| | | | |
|---|---|---|---|
| 5,684,984 A | 11/1997 | Jones et al. ................... 707/10 |
| 5,734,901 A * | 3/1998 | Sidhu et al. ................ 709/206 |
| 5,758,354 A | 5/1998 | Huang et al. ............... 707/201 |
| 5,812,773 A | 9/1998 | Norin ........................ 709/204 |
| 5,961,590 A | 10/1999 | Mendez et al. ............. 709/206 |
| 6,131,096 A | 10/2000 | Ng et al. .................... 709/206 |
| 6,167,402 A | 12/2000 | Yeager ....................... 709/206 |
| 6,292,828 B1 * | 9/2001 | Williams .................... 709/218 |
| 6,324,587 B1 | 11/2001 | Trenbeath et al. .......... 709/206 |
| 6,370,521 B1 * | 4/2002 | Pigos, Jr. et al. .......... 709/203 |

OTHER PUBLICATIONS

"Operating System Architecture (sections)", last updated May 26, 1999, 6 pages.
"The Microsoft Win 32 Programming Model: A Primer for Embedded Software Developers", last updated May 26, 1999, pp. 1–10.
"Microsoft Windows CE Communications", last updated May 26, 1999, pp. 1–4.
"The Microsoft Foundation Class Library and Active Template Library for Windows CE", last updated May 26, 1999, pp. 1–7.
"Microsoft Windows CE–Based Networking", last updated May 26, 1999, pp. 1–6.

* cited by examiner

Primary Examiner—Bharat Barot
(74) Attorney, Agent, or Firm—Merchant & Gould

(57) ABSTRACT

A set of APIs is used in creating and maintaining hierarchical folder structure for the storage of electronic messages in a hand-held computer. Such a folder structure permits the creation of a folder hierarchy for each message service with which the user has an account. As a result, the hand-held message store can organize messages received from different services. The APIs provide the functions necessary for an application process to access messages in the hierarchical folder structure. This set of APIs also provides backwards compatibility with APIs utilized to create and maintain a flat folder structure organization of the message store. This backward compatibility permits a hand-held computer embodying the present invention to be used to execute application processes that were developed to interact with an earlier generation flat folder structure.

72 Claims, 13 Drawing Sheets

APPLICATION PROGRAMMING INTERFACE FUNCTIONS FOR SUPPORTING AN IMPROVED MESSAGE STORE FOR HAND-HELD COMPUTERS

TECHNICAL FIELD

The present invention relates to a message store for hand-held computers such as Handheld PC or Palm-size PC. More particularly, one aspect of the present invention relates to a set of application programming interface functions (APIs) which are utilized to store, manipulate, and retrieve electronic messages from a message store that has a hierarchical folder structure. Another aspect of the present invention relates to a set of APIs which are utilized to store, manipulate, and retrieve electronic messages in a message store system having a hierarchical folder structure that is backward compatible with previous more primitive versions of the Handheld PC/Palm-size PC message store.

BACKGROUND OF THE INVENTION

As computers continue to develop, people are becoming more reliant on them for both conducting business and managing their everyday affairs. This ever-increasing acceptance is particularly true for hand-held computers, which are commonly used as personal information managers (PIM). PIM functions commonly contain e-mail, task list, calendar and contact information. Most hand-held devices can be synchronized with PIM data that is stored on a remote computer such as a network server or a desktop personal computer.

A particularly useful feature of hand-held computers is the inclusion of messaging software for receiving and managing electronic messages such as e-mails. Furthermore, more and more users have multiple messaging accounts with different services. For example, a user might have an e-mail account with his or her employer, a personal e-mail account with a commercial service, and an e-mail account for a home-based business.

Electronic messages are created, manipulated, stored, retrieved, and maintained using application processes executing on the hand-held computers. These application processes comprise e-mail client processes and hand-held computer synchronization processes. These application processes interact with the message stores by calling APIs developed to provide these functions.

Electronic messages are typically stored in a message store database. The message store system usually permits a user to organize his or her messages into folders such as those commonly named Inbox, Outbox, and Deleted Items. Additionally, most message store systems allow the user to define his or her own folders so that the user can organize and manage their messages in a way that suits their individual needs.

The application processes interact with the message store through the use of a set of APIs. These APIs comprise a set of functional routines used by an application process to direct the performance of procedures by other computer processes. For application processes that interact with the message store systems, these APIs permit the application to store data within the message store, to retrieve data from the message store, and to traverse through a folder architecture used to organize the messages within the message store system.

One problem with the current architecture for message stores on many Handheld PCs is that they contain only a single, flat folder structure. In other words, the message store system does not allow a parent/child relationship between folders. Nor does the message store allow different sets of folders. There is only one set or group of folders that can include up to 256 folders. Accordingly, current message store systems typically place all electronic messages that are received in the same flat folder structure or set of folders. Currently messages coming from different services are placed in the same set of folders.

Another problem arises because many applications still utilize application processes that expect to interact with an early generation of Handheld PC/Palm-size PC messages stores that have a flat folder architecture. Even if a hand-held computer was designed with a message store that addresses these problems, it would not be compatible with these application processes that use an earlier generation of API function calls to interact with a flat folder architecture for the message store system. This limitation would prevent many users from upgrading the message store on their hand-held computers. If they did upgrade their hand-held message store, they would be required to also upgrade the application processes used to manipulate data within the message store.

SUMMARY

The present invention addresses these problems by providing a set of APIs used in creating and maintaining hierarchical folder structure for the storage of electronic messages in a hand-held computer. Such a folder structure permits the creation of a folder hierarchy for each message service with which the user has an account. As a result, the hand-held message store can organize messages received from different services. The APIs provide the functions necessary for an application to access messages in the hierarchical folder structure.

Another aspect of the preset invention also provides backward compatibility with APIs utilized to create and maintain a flat folder structure organization of the message store. This backward compatibility permits a hand-held computer embodying the present invention to execute application processes that were developed to interact with an earlier generation flat folder structure.

Yet another aspect of the present invention addresses the replacement of the flat folder architecture by a user-defined, hierarchical folder architecture. The flat folder architecture uses an 8-bit value to indicate the folder ID for the message being processed. This parameter imposed a limit of 256 folders, including the special folders of Inbox, Outbox, and Sent. The user-specified, hierarchical folder structure uses a 16-bit field for the folder ID in order to allow many more folders to be present in the message store. As a result, a backward compatibility module within an improved message store is needed to check this folder ID parameter to determine if the folder ID is less than 256. If it is less than 256, a data manipulation module assumes that the application process is interacting with the default hierarchy. The data manipulation module then creates a 16-bit version of the folder ID parameter before issuing a command to the corresponding extended API which implements the functionality of the called standard API. The backward compatibility module also converts the folder IDs of special folders, ie. Inbox, Outbox, and Sent folders, to the folder IDs of corresponding special folders in the folder hierarchy corresponding to the service from which the message is downloaded.

DETAILED DESCRIPTION

The following discussion is intended to provide a brief, general description of a suitable computing environment in which the invention may be implemented. Although not required, the invention will be described in the general context of computer-executable instructions being executed by a hand-held computer. The structure, creation, and use of a message store hierarchical folder structure are described after the discussion of an exemplary operating environment.

Additionally, the logical operations of the various embodiments of the invention described herein are implemented as: (1) a sequence of computer implemented steps running on a computing system; and/or (2) interconnected machine modules within the computing system. Modules represent functions executed by program code such as the code found in a dynamic-link library (DLL). The implementation used is a matter of choice dependent on the performance requirements of the hand-held computer and/or the server. Accordingly, the logical operations making up the embodiments of the invention described herein are referred to alternatively as operations, steps, or modules.

Figure 1:
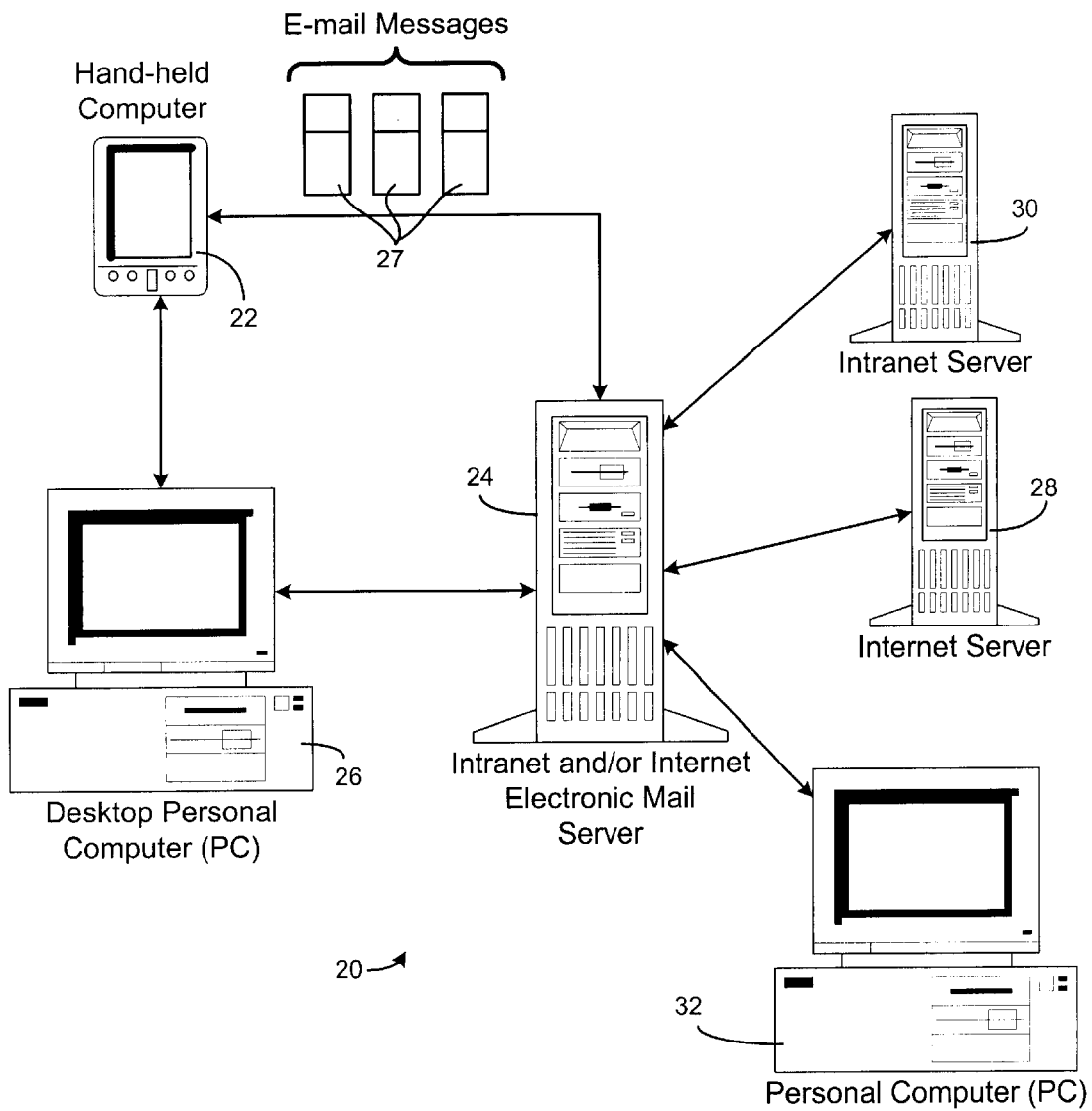
FIG. 1 illustrates a logical block diagram of a multi-computer processing system used to exchange electronic messages according to one embodiment of the present invention.

A client/server network system 20 comprising a client computer system 22 which is connected to a server computer system 24 is shown in FIG. 1. The client computer system 22 is a portable hand-held computer that includes an operating system capable of carrying out the steps of the present invention. The hand-held computer 22 is also connectable to a desktop personal computer (PC) 26 as a companion device, wherein the desktop PC connects to the server 24. The term "hand-held computer" as used herein broadly means any small computer platform in which the operating system is not required to boot when the power is turned on so that various programs can be instantly used by a user. Examples of hand-held computers include those that are commercially available as Handheld PC's (i.e., H/PC and H/PC Pro), Palm-sizePCs, AutoPC's (i.e., personal computers mounted onboard of a motorized vehicle), and other computers having similar platforms. Other examples include kitchen appliances, telephones, watches, television set-top boxes, consumer electronics, and any other device that include computers having similar platforms.

The server 24 is either an Internet server or an Intranet server that sends and receives electronic items, such as electronic mail messages (e-mail) 27, through various connections or gateways to other computer systems, such as an Internet e-mail server 28, an Intranet server 30, and/or another desktop PC 32. The server 24 receives e-mail messages from the other computing systems 28, 30, and 32 and stores these e-mail messages for the user of the hand-held computer 22 and the PC 26 in an account dedicated to that user.

The e-mail server communicates with the various computers 22, 26, 28, 30 and 32 using specific protocols, i.e., rules governing the type and form of communications. The e-mail server may communicate with the hand-held computer 22 using a variety of protocols such as the Post Office Protocol (POP), the Internet Message Access Protocol (IMAP), or some other protocol. POP is rudimentary and offers few operational features to the user. IMAP offers more features in communication between a client device, such as the hand-held computer 22, and the network server device such as the server 24.

The hand-held computer 22 has a messaging system that receives and stores server-based items, such as the e-mail messages 27, in multiple folder hierarchies with each hierarchy associated with the server providing the server based items. The messaging system is capable of handling messages for both flat folder storage architecture and the new hierarchical folder storage architecture.

Figure 2:
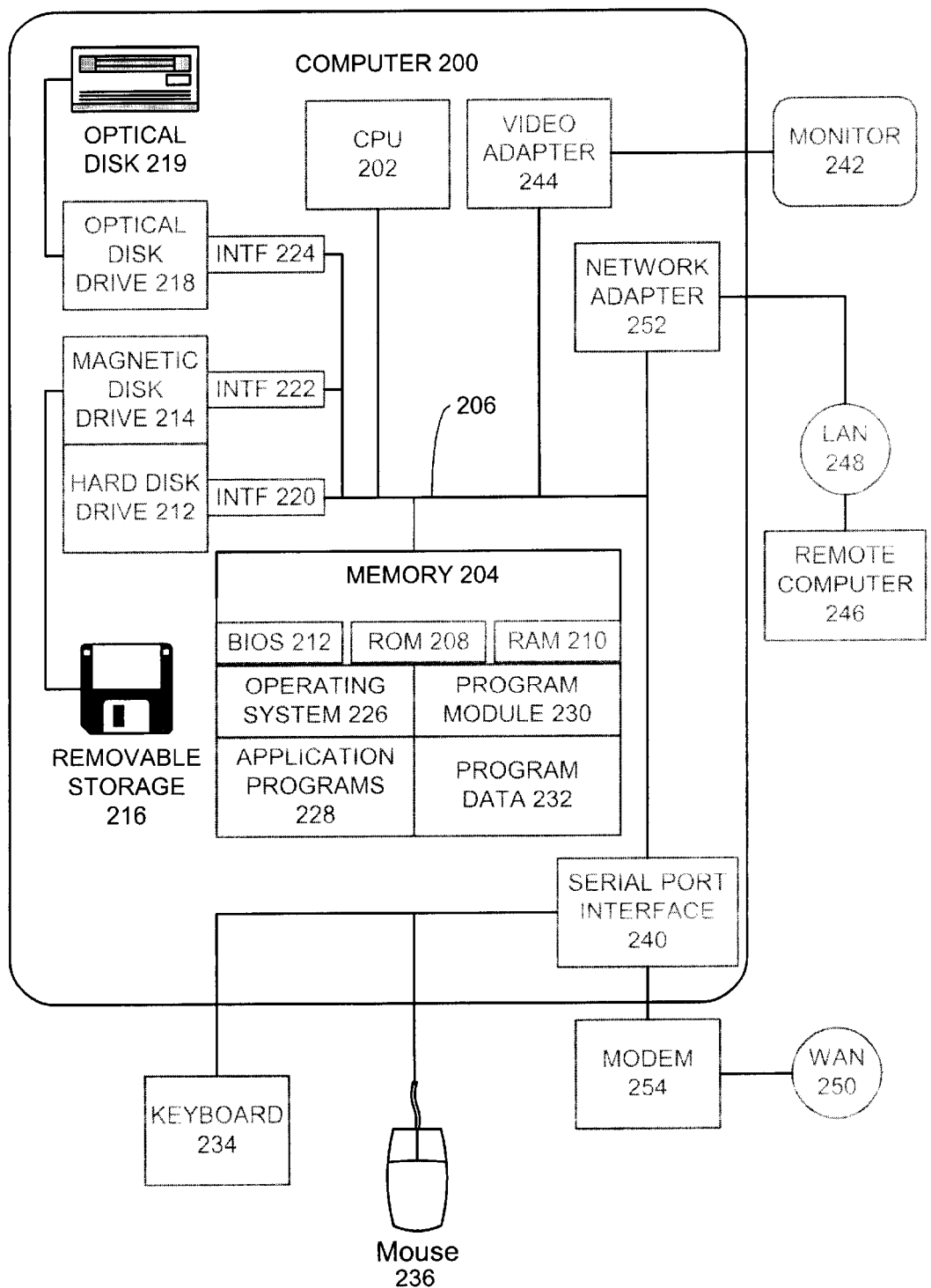
FIG. 2 illustrates a logical block diagram for a hand-held computer according to an example embodiment of the present invention.

FIG. 2 and the following discussion are intended to provide a brief general description of a suitable computing environment in which the invention may be implemented. One possible embodiment of a Handheld PC, which is one type of hand-held computer 22, incorporates a computer 200 having at least one central processing unit (CPU) 202, a memory system 204, an input device 234, and an output device 244 These elements are coupled by at least one system bus 206.

The CPU 202 is of familiar design and includes an Arithmetic Logic Unit (ALU) for performing computations, a collection of registers for temporary storage of data and instructions, and a control unit for controlling operation of the system. The CPU 202 may be a microprocessor having any of a variety of architectures including, but not limited to those architectures currently produced by Intel, Cyrix, AMD, IBM and Motorola.

The system memory comprises a main memory 204, in the form of media such as random access memory (RAM) 210 and read only memory (ROM) 208, and may incorporate a secondary storage in the form of long term storage mediums such as hard disks 214, floppy disks 216, tape, compact disks (CDs) 219, flash memory, etc. and other devices that store data using electrical, magnetic, optical or other recording media. The main memory may also comprise video display memory for displaying images through the output device 242, such as a display device. The memory can comprise a variety of alternative components having a variety of storage capacities such as magnetic cassettes, memory cards, video digital disks, Bernoulli cartridges, random access memories, read only memories and the like may also be used in the exemplary operating environment. Memory devices within the memory system and their associated computer readable media provide non-volatile storage of computer readable instructions, data structures, programs and other data for the computer system.

The system bus may be any of several types of bus structures such as a memory bus, a peripheral bus or a local bus using any of a variety of bus architectures. The input and output devices are also familiar. The input device can comprise a keyboard, a mouse, a microphone, a touch pad, a touch screen, etc. The output devices can comprise a display, a printer, a speaker, a touch screen, etc. Some devices, such as a network interface or a modem can be used as input and/or output devices. The input and output devices are connected to the computer through system buses 206.

The architecture similar to that described above can be used with other types of hand-held computers 22, desktop PC's 26, and servers 24. The computer system further comprises an operating system and usually one or more applications or programs. The operating system comprises a set of programs that control the operation of the system, control the allocation of resources, provide a graphical user interface to the user and includes accessory and utility programs. An example of an operating system that can run on the hand-held computer is the "WINDOWS CE" operating system, which also is commercially available from Microsoft Corporation. A program is software that runs on top of the operating system software and uses computer resources made available through the operating system to perform application specific tasks desired by the user.

Figure 3:
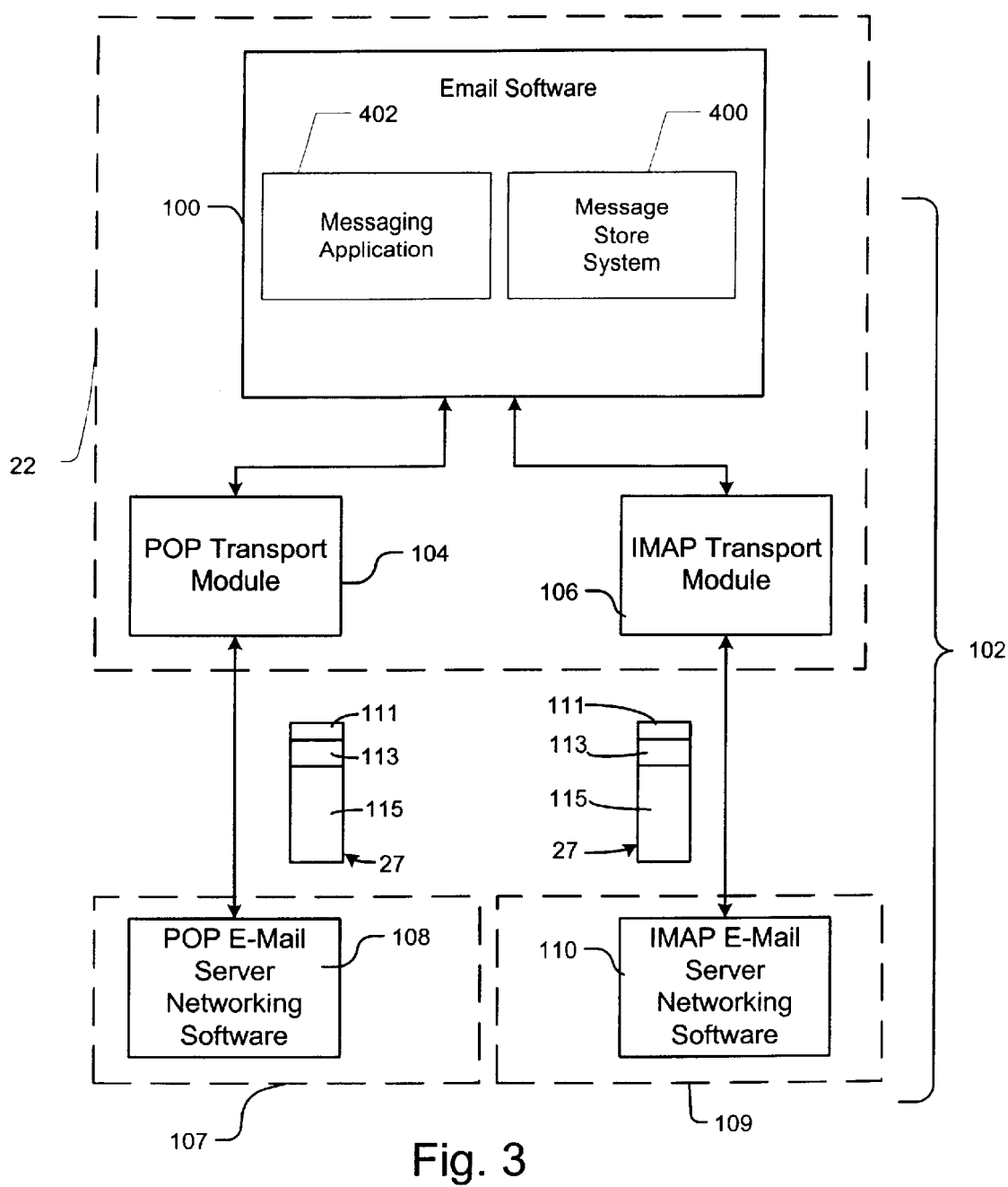
FIG. 3 illustrates a logical block diagram for an electronic message retrieval system according to one embodiment of the present invention.

In one possible embodiment as illustrated in FIG. 3, the e-mail software is a program such as the "INBOX" e-mail application 100 that is commercially available from Microsoft Corporation, and is packaged with the "POCKET OUTLOOK" suite of programs. In yet another possible embodiment, the e-mail software can be integrated into, or otherwise form a part of, the operating system. The e-mail application 100 running on the Handheld PC or Palm-size PC interacts with a remote server 107 or 109 to create an e-mail retrieval system 102.

The e-mail software 100 works directly with communication software known as transport modules. One module is a POP transport module 104 and another is an IMAP transport module 106. The POP transport module 104 is a network communications layer designed specifically to communicate with POP communications software 108 located on a POP e-mail server 107. POP server 107 is a particular embodiment of the server 24 (FIG. 1). Alternatively the e-mail software 100 communicates via the IMAP transport module 106 which is a network communication layer designed to communicate with IMAP software 110 on an IMAP e-mail server 109. IMAP server 109 is another embodiment of the server 24 (FIG. 1). Depending on whether hand-held computer 22 is configured to communicate with server 107 or 109, transport module 104 or 106 is used. The user configures the hand-held computer 22 to communicate via a particular transport based on their particular e-mail account and the protocol employed by the e-mail server. However, with respect to the e-mail software 100, the requests, commands and responses are the same regardless of which transport module 104 or 106 is used.

The e-mail software 100 sends command requests to the transport module 104 or 106 requesting actions be performed by the server 107 or 109. Such actions might be to retrieve server based items such as e-mail messages. When a request is received by the module 104 or 106, the module 104 or 106 converts the command into data signals that are sent to the e-mail server 107 or 109 over the network connection. The e-mail server 107 or 109 and its networking software 108 or 110 receives these data signals, compiles the signals, analyzes the signals and performs the requested operations in response to the signals. Once the server 107 or 109 performs the operations, the server returns information to the transport module 107 or 109 either acknowledging the operation was completed successfully or that an error occurred.

The response from the server also includes the data requested by the software 100. The response is in the form of data signals that are sent to the module 104 or 106 which compiles the data signals into a meaningful response and transports the response to the e-mail software 100. The software 100 is then able to parse and use the response accordingly.

The subject of the requests from the software 100 to the server 107 or 109 relate to e-mail messages 27. Each e-mail message 27 is an electronic document that is made up of at least three elements, an identification element (ID) 111, header information 113, and a message body 115. The ID 111 is used internally by the hand-held computer 22 or the server 24 to identify the message and may be simple such as an integer or more complex such as a file name or other ID string. The header 113 has information about the e-mail message 27 such as originator, addressee, time created and the subject of the e-mail message 27. The header 113 may include other fields as described hereinafter. The body 115 is the actual message created by the creator of the e-mail message and may include text, graphics, other files or attachments.

Figure 4:
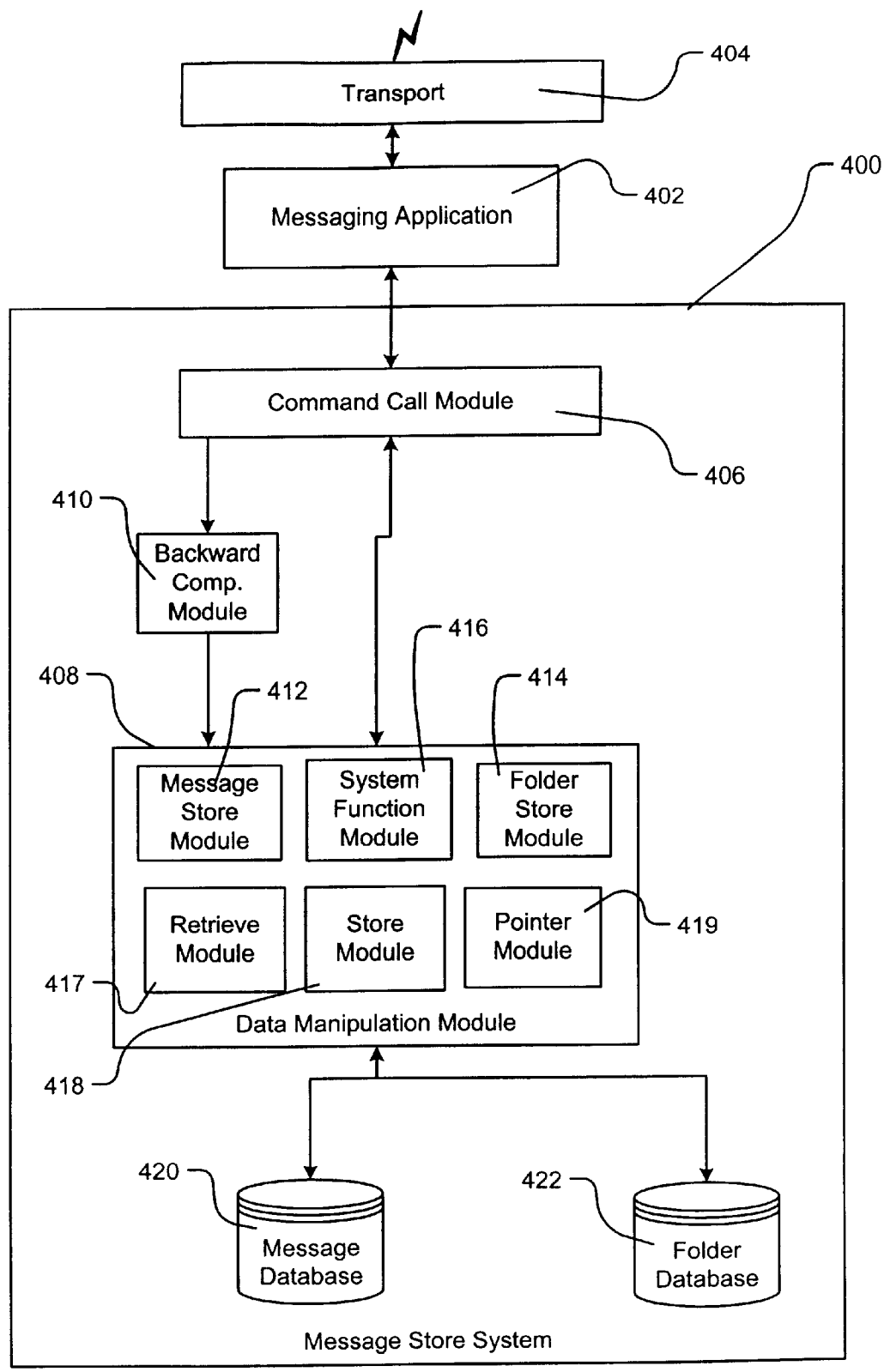
FIG. 4 illustrates a logical block diagram for a processing system within a message store system according to an example embodiment of the present invention.

FIG. 4 shows one embodiment of a message store system 400 in accordance with the invention. In one possible embodiment, the message store or mail store system is a part of the e-mail software 100 in FIG. 3. In other possible embodiments, the message store is a program that is separate from, but may interface with, the e-mail software 100. The message store system runs on top of the operating system in the hand-held computer 22 and interfaces with messaging application 402. Messaging application 402 performs PIM operations, such as e-mail, calendars, tasks, etc., on the hand-held computer and also potentially handles the communications with a server computer or desktop computer through transport 404.

Message store commands from the messaging application 402 are received by the command call module 406. The message store commands may be in the form of the standard mail store API commands or in the form of the new extended mail store API commands. These extended mail store API commands follow the protocol of the extended mail store API's described in detail hereinafter. Command call module 402 passes extended API commands directly to the data manipulation module 408. The extended API commands are the commands required to create and use the hierarchical folder structure. The data manipulation module 408 executes the extended API commands to implement the operations performed on the hierarchical folder structure in the new mail store system.

If the message store command is in the form of a standard mail store command working with a flat folder structure, then command call module 406 passes the standard API command to the backward compatibility module 410. Backward compatibility module 410 translates the standard API command to an extended API command. Module 410 also converts the parameters in the standard API command to the parameters required for the extended API command. The resulting extended API command is then executed by the data manipulation module 408.

Data manipulation module 408 includes multiple functional modules for executing the extended API commands. Message store module 412 executes commands to organize messages in the folders. Folder store module 414 executes commands to create and manipulate the hierarchical folders. System function module 416 performs mail store system functions such as initialization and memory management. The retrieve, store and pointer modules 417, 418 and 419 respectively, execute extended API commands to read and write data on the message database 420 and the folder database 422. In one possible embodiment, the databases 420 and 422 are programmed to remove "stale" records as needed. This database scheme conserves memory on the hand-held computer 22. In another possible embodiment, furthermore, all of the records in the message database 420 and the folder database 422 can be stored in a single database.

Figure 5:
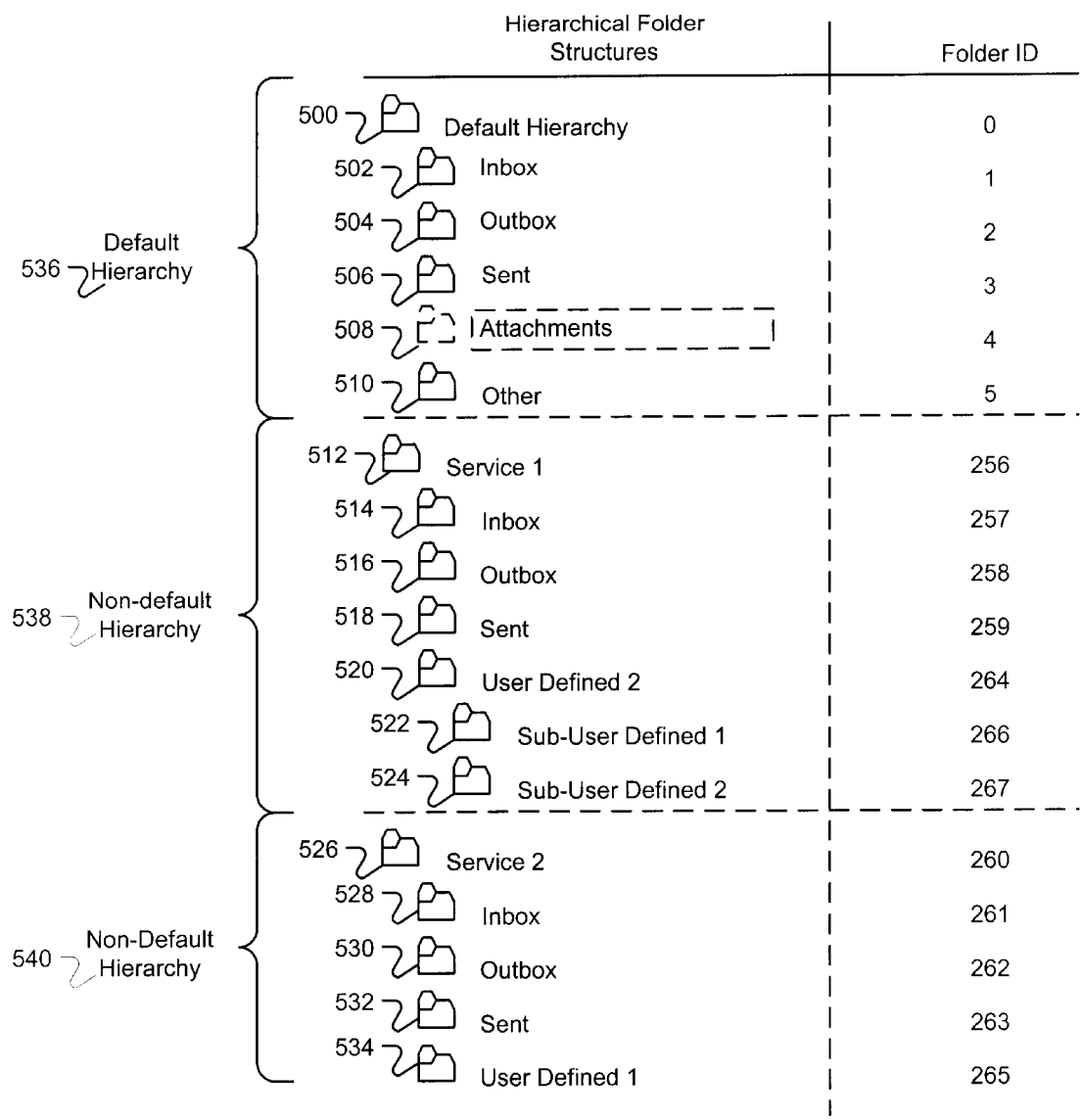
FIG. 5 illustrates a set of multiple hierarchies within a user-specified, hierarchical folder architecture for a message store system according to an example embodiment of the present invention.

FIG. 5 illustrates an example of a group of folder hierarchies. Each folder that is created by the folder store module 414 in the hand-held computer 22 is organized inside a folder hierarchy. Each folder hierarchy includes a root or top-level folder and may have one or more subfolders. The root folders do not contain messages, only subfolders. Each subfolder may have one or more sub-sub folders, and so on. In this embodiment, each root folder and its subfolders forms a separate folder hierarchy.

Each folder is identified with a 16-bit folder ID. Accordingly, the messaging system can create and organize over 65,000 folders, and in one possible embodiment can have up to 65,536 folders. These folders can be organized into virtually any structure of root folders and subfolders that the user desires. Any combination of folders and subfolders is possible.

The default hierarchy is used when the message store is called by an older messaging application via standard mail store API commands. The default folder hierarchy provides backward compatibility, as it is the only hierarchy visible to older messaging applications. As discussed in more detail, all of the messages in non-default folder hierarchies are then presented to the older messaging application as if they are collected into a single specific folder, named "Other," in the default hierarchy folder structure. No such folder actually exists; it is simulated to allow presentation of messages from the non-default hierarchies to the older messaging applications.

Furthermore, another specific folder, named "Embedded," in the default hierarchy folder structure is reserved for the storage and management of messages that are attached to other messages. This reserved folder is hidden, as illustrated by the dashed lines, and is not included in the user interface displayed on the hand-held computer 22. In this structure, messages attached to other messages never have to be moved when the main message is moved. This structure also prevents a user from deleting the attached message, by means other than deleting the message it is attached to. Additionally, the message store module 412 includes code that, when a message deletion is requested, deletes corresponding attached messages as well, if any are present.

In the example illustrated in FIG. 5, there are three root folders 500, 512, and 526. The first root folder 500 is named Default Hierarchy and is a parent for an Inbox folder 502, an Outbox folder 504, a Sent folder 506, hidden "Embedded" folder 508, and a simulated "Other" folder 510. The second root folder 512 is named Service 1 and is a parent for an Inbox folder 514, an Outbox folder 516, a Sent Folder 518, and a User Defined folder 520. The User Defined Folder, in turn, is a parent to User Defined folders 522 and 524. The third root folder 526 is named Service 2 and is a parent for an Inbox folder 528, an Outbox folder 530, a Sent Folder 532, and a User Defined folder 534. The first root folder 500 forms the root for a default folder hierarchy 536. The second and third root folders 512 and 526 form the root for non-default folder hierarchies 538 and 540, respectively.

The hierarchical folder structure illustrated in FIG. 5 is only an example. Many other possible embodiments and hierarchical folder structures are possible. Additionally, other possible embodiments might include code in the folder store module 414 that places limits on the number of folders that a user can create and the structure of folders that a user can create. For example, the folder module 414 might automatically create an Inbox, Outbox, and Sent subfolders for each hierarchy that the user creates. These subfolders are used by the messaging application 402 in managing messages as they are received from and sent to the messaging service. In another example, the folder store module 414 might limit or control the number and type of folder hierarchies that a user can create.

Figure 6A:
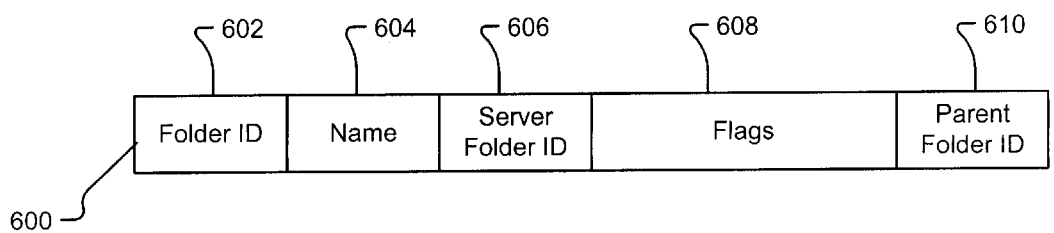
FIG. 6A illustrates a data record stored within a folder database of a message store system according to one embodiment of the present invention.

Referring now to FIG. 6A, each folder stored in the folder database 422 of the hand-held computer 22 has a folder data structure 600 that includes fields relating to data for a folder ID 602, a folder name 604, a server folder ID 606, flags 608, and a parent folder ID 610. Both the folder ID and the parent folder ID are 16-bit binary values. As each folder is generated by the folder module 414, a record in the folder database 422 is created and a folder ID value is stored in the folder ID field. Within the default folder hierarchy, all folders have a folder ID equal to or less than 255. All folders within non-default folder hierarchies have a folder ID value equal to or greater than 256. No two folders have the same value for a folder ID.

The parent folder ID is the folder ID for the next most dominant folder in a given folder hierarchy. The parent folder ID assigned to root folders is a predetermined value between 0 and 65,535 that indicates the folder is a root and does not have a parent. In one possible embodiment there is only one root folder assigned in the folder ID range of 0–255. All other root folders are in the range from 256–65,535.

The name field 604 contains alphanumeric data representing the name for the folder. The flag field 608 contains binary flags used in managing the folders. Each flag is a bit in a 32-bit value and is used for a specific function. For example, the flag field is used in the synchronization of folders, it allows for various folder properties to be defined, and it communicates certain changes in the folder state on the hand-held computer 22 to the messaging application during the synchronization process.

The server folder ID field 606 contains data identifying the corresponding folder on the server 24. The value for the server folder ID is determined during synchronization of folders between the message store on the hand-held computer and the messaging system on a server 24. One possible application for this exemplary embodiment is a folder hierarchy set up for each messaging service from which a user receives e-mails. The first root folder 512 and its subfolders 514–524 store and organize messages received from a first messaging service such as one used for a work e-mail account. The second root folder 526 and its subfolders 528–534 store and organize messages received from a second messaging service such as a messaging service to which a user subscribes for a personal e-mail account.

In order to allow a user to set up multiple e-mail accounts with the same server, folder data structure 600 needs to contain information uniquely identifying a folder-belonging to a particular user e-mail account. In one possible embodiment, the server folder ID field contains information about both the e-mail server and the user account. These server folder IDs are generated by an appropriate transport during folder synchronization and are likely to be globally unique. In another possible embodiment, folder data structure 600 includes separate fields for the server name and user e-mail account information.

Figure 6B:
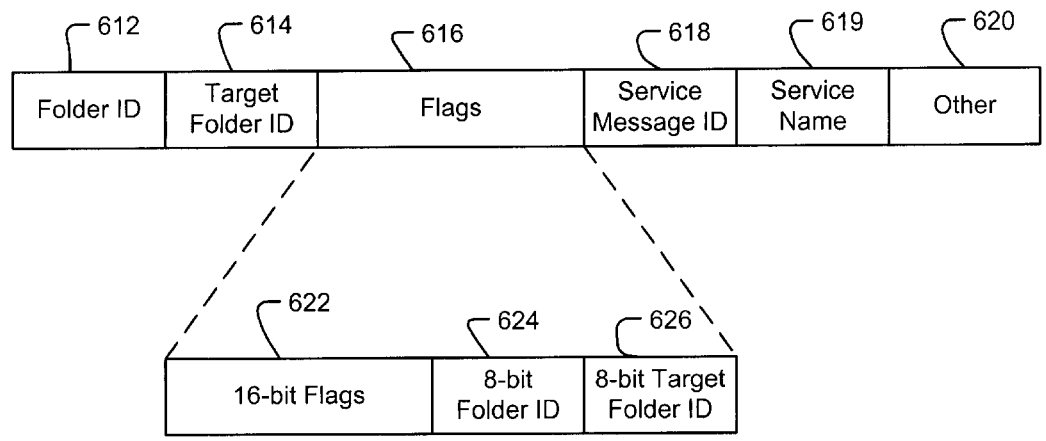
FIG. 6B illustrates a data record stored within a message database of a message store system according to one embodiment of the present invention.

Referring now to FIG. 6B, the message data structure generated for each message by the message module 412 in the hand-held computer 22 includes a folder ID field 612, a target folder ID field 614, a flag field 616, a server message ID field 618, and a service name field 619. The message data structure also can include some other fields 620 that store data used for managing the messages. Examples of such data include keywords used to relate records in the message database with records in the folder store and data identifying any files that were attached to the message. The fields that form the message data structure are stored in the message store with other information relating to the message including header information and the text of the message.

The folder ID is the value of the folder ID for the corresponding folder under which the message is stored. If a user moves a message from one folder to another, the folder ID to which the user is moving the message is stored in the target folder ID field 614. The folder ID of the original folder location remains in the folder ID field. The folder ID stored in the target folder ID field 614 is written into the folder ID field 612 during the synchronization process. This use of a target folder ID preserves the original location of the message object so that it can be compared to the corresponding message object in the server's 24 messaging system and updated accordingly.

The flags field 616 is a 32-bit value. Sixteen of the flag bits in the flags field 616 are stored in a 16-bit flags field 622 and are used in a conventional manner during the synchronization process. These sixteen bits allow for various message properties to be defined and communicate certain changes in the message on the hand-held computer 22 to the server 24 during the synchronization process. Eight of the flag bits correspond to an 8-bit folder ID and are stored in an 8-bit folder ID field 624, and eight of the flag bits correspond to an 8-bit target folder ID and are stored in an 8-bit target folder ID 626. When the messaging application calling the message store is an older messaging application that uses standard mail store API commands, the 8-bit folder ID and the 8-bit target folder ID will be used in lieu of the folder ID and the target folder ID for backward compatibility purposes.

If the folder ID has a binary value of 255 or less, the 8-bit folder ID embedded in the flags has the same value as the folder ID. The 8-bit target folder ID embedded in the flags similarly mirrors the target folder ID. If the folder ID has a binary value of 256 or greater, the 8-bit folder embedded in the flags has a predetermined value that is hard coded in the messaging system software. This predetermined value represents the simulated "Other" folder 510 that is reserved in the message store. As discussed in more detail below, all messages having this predetermined value embedded in its flags appear to older messaging applications to be stored in this reserved folder 510. This mechanism permits messages in the non-hierarchical folders to be accessible by to the older messaging applications that use standard mail store API commands.

The server message ID field 618 contains data identifying the corresponding message that is stored on the server. The value for this data is determined during the synchronization process. The service name field 619 contains data identifying the service that was used to communicate the message.

Figure 7:
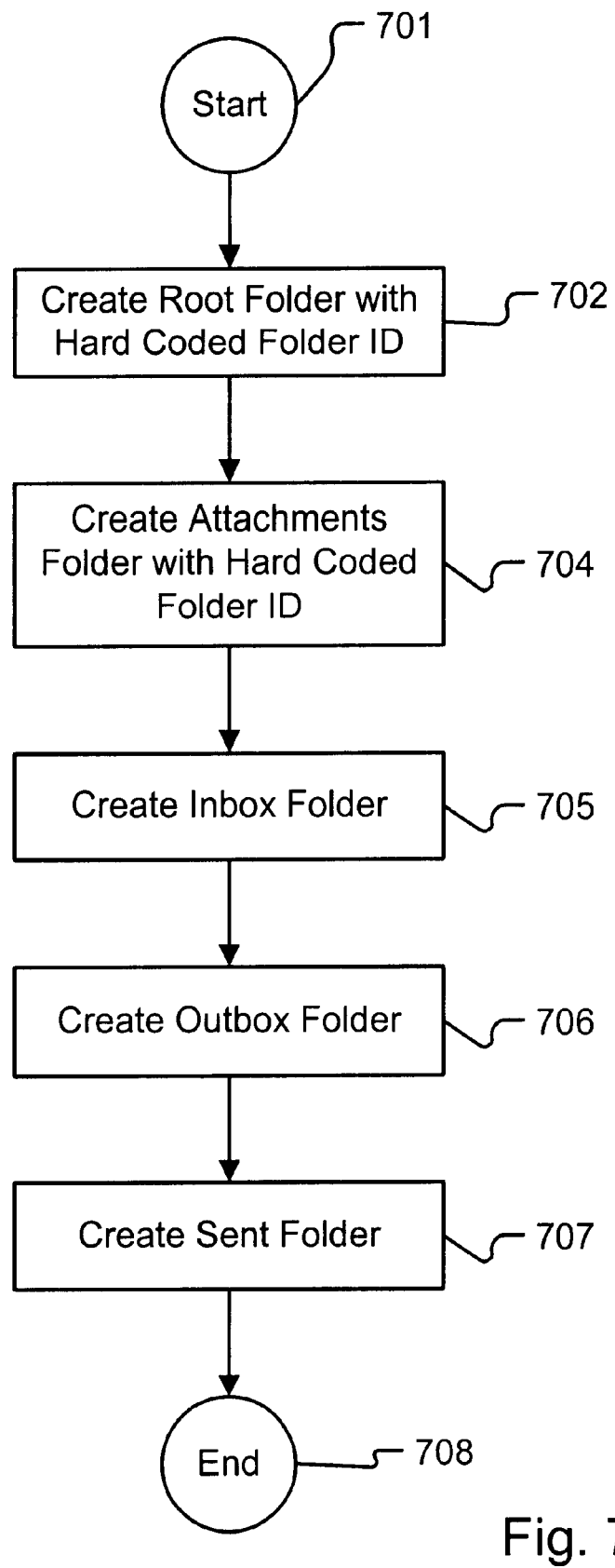
FIG. 7 illustrates a logical operational flow diagram for the processing operations performed by a message store system when creating a default hierarchy according to one embodiment of the present invention.

Referring to FIG. 7, creation of the default hierarchy of folders involves several operations including several initialization operations for the system folders present in the default hierarchy. One of the initialization operations initializes the message and folder database. A root folder operation 702 then creates the root folder for the default hierarchy and assigns the binary value of 250 as the folder ID. Subsequent operations 703 and 704 create the "Embedded" folder, whose folder ID value is also hard coded by the folder store module 414 to be 251. As discussed above, the folder entitled "Other" is a simulated folder and requires no creation. Special folder ID value assigned to this simulated folder is 249.

When the folder database 422 is being loaded and initialized in the hand held-computer, the folder store module 414 automatically creates the "Embedded" folder, as well as an Inbox folder, Outbox folder, and Sent folder, in the default folder hierarchy. An Inbox operation 705 creates the Inbox folder and assigns a binary value of 254 as the folder ID for the Inbox folder. The Inbox operation 705 also sets the value for the parent folder ID equal to the folder ID of the root folder. Similarly, the Outbox operation 706 creates an Outbox folder by assigning a binary value of 253 as the folder ID for the Outbox folder, and setting the value of the parent folder ID for the Outbox folder to the folder ID of the root folder. The Sent operation 707 creates a Sent folder assigning a binary value of 252 as the folder ID for the Sent folder, and setting the value of the parent folder ID for the Sent folder to equal the folder ID of the root folder. In one possible embodiment, the folder ID values for the default root folder, "Other" folder, "Embedded" folder, Inbox folder, Outbox folder, and Sent folder are hard coded or reserved.

Figure 8:
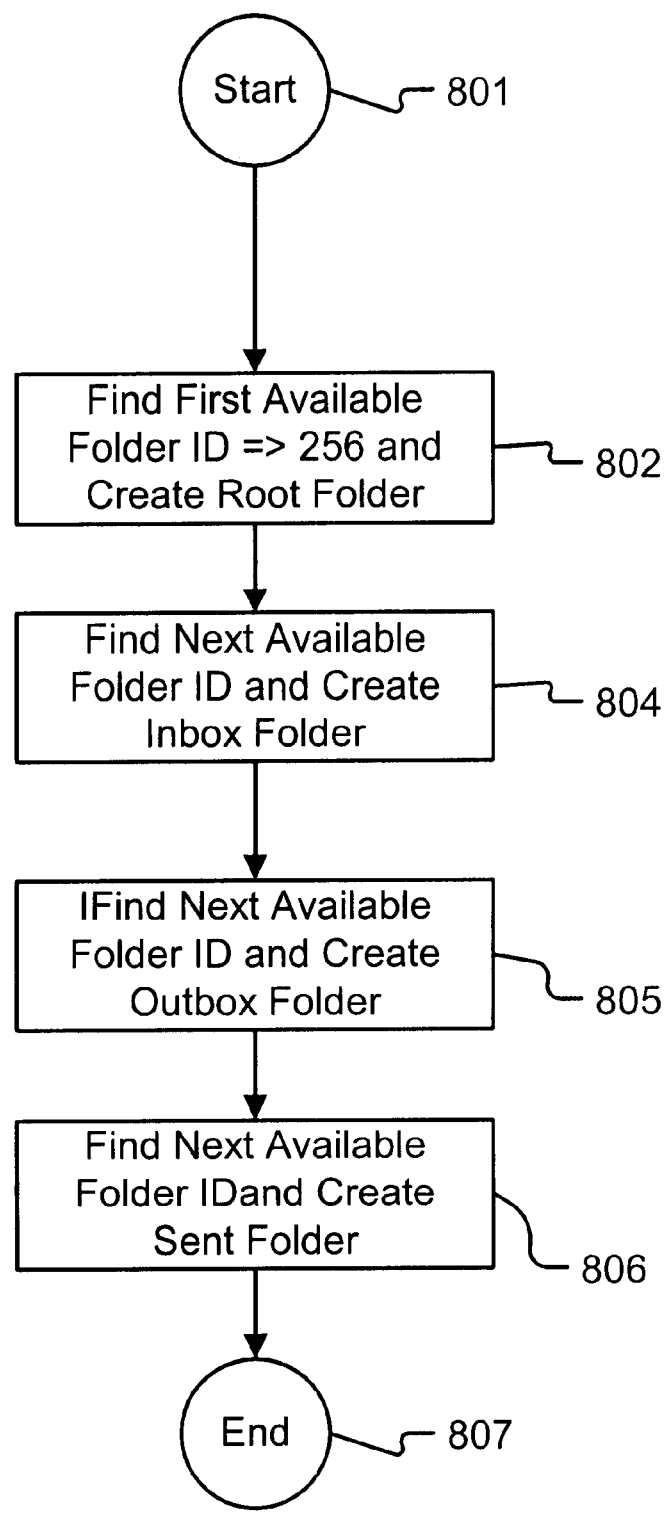
FIG. 8 illustrates a logical operational flow diagram for the processing operations performed by a message store system when creating a non-default hierarchy according to one embodiment of the present invention.

Referring to FIG. 8, when a user subscribes to a new messaging service, the message store system executes several operations including a find-next available folder ID operation 802, which is performed to find the first available folder ID that is not currently in use. This folder ID value is used as the folder ID for the root folder in the new folder hierarchy. The find-next available folder ID operation 802 sequentially searches the folder database, starting at the database record that would correspond to the folder data structure record having a folder ID of 256 until it fails to find a requested folder ID value, and thus locates an entry in the folder database that is not in use. The folder ID corresponding to that absent entry in the folder database becomes the folder ID for the folder that is currently being created. A root-folder operation 802 creates a root folder for the new messaging service. The first root folder created for a non-default hierarchical folder structure will have a binary value of 256.

After the root folder is created, an Inbox operation 804 then creates the Inbox folder by once again finding the next available folder ID and then assigning that value as the folder ID for the Inbox folder. The Inbox operation 804 also sets the value for the parent folder ID to equal the folder ID for the root folder. Similarly, the Outbox operation 805 finds the next available folder ID and assigns the returned value to the folder ID for the Outbox folder. The value for the parent folder ID is set equal to the folder ID for the root folder. A Sent operation 806 finds the next available folder ID and assigns the returned value to the folder ID for the Sent folder. The value for the parent folder ID is set equal to the folder ID for the root folder.

Figure 9:
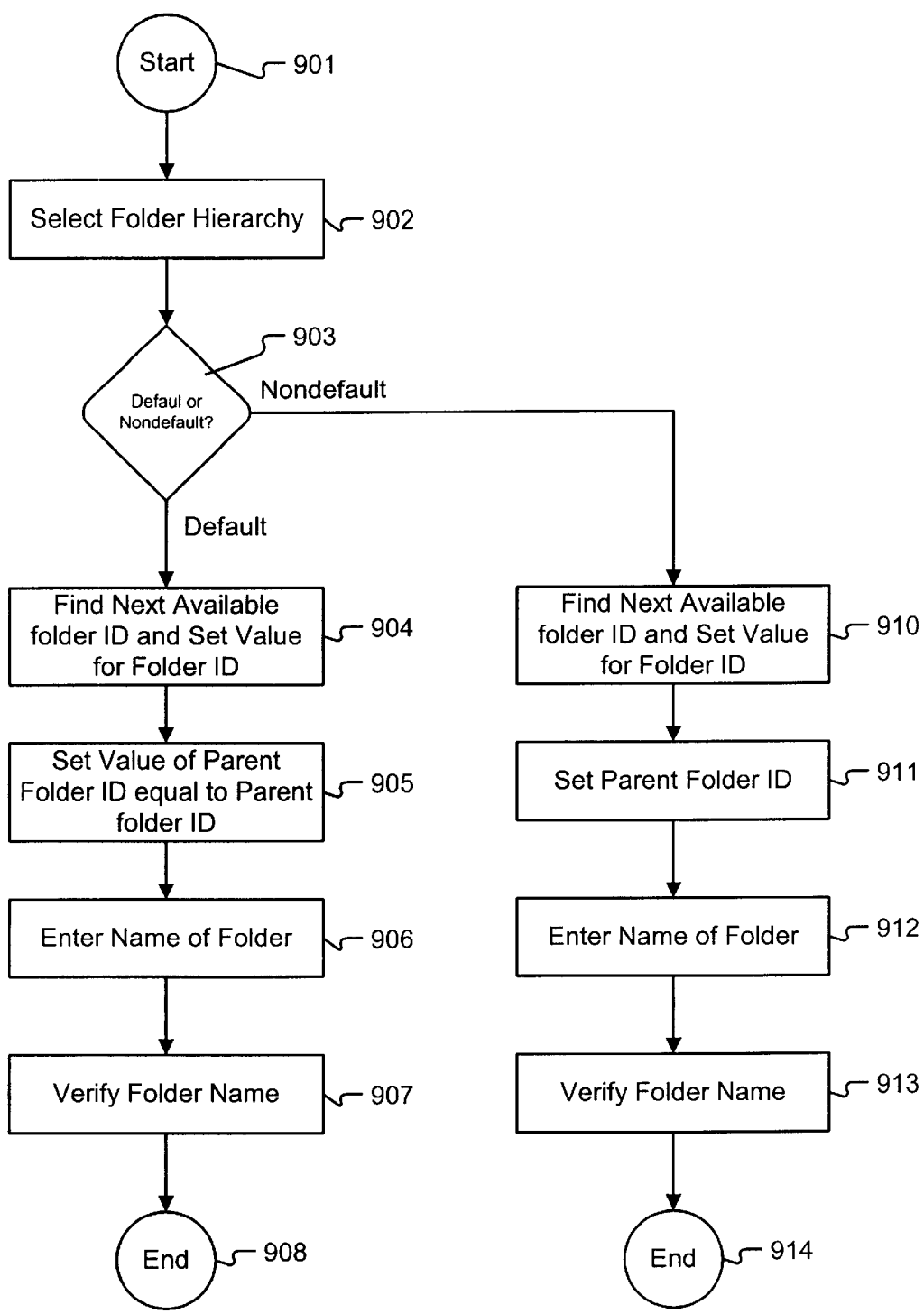
FIG. 9 illustrates a logical operational flow diagram for the processing operations performed by a folder module when creating a new folder according to one embodiment of the present invention.

Referring to FIG. 9, the folder store module 414 includes operations for creating a new folder. A selection operation 902 prompts the user to select a parent folder under which the new folder will be added. If the user selects a parent folder in the default hierarchy, a folder ID operation 904 finds the next-available folder ID between 0 and 255 using a search technique similar to that outlined above and then sets the value of the folder ID to the requested value that the search failed to find in the folder database. If the search fails to find any available folder ID's between 0 and 255, the folder store module 414 generates an error indicating that no more folders can be created in the default folder hierarchy. Parent Folder ID operation 905 then sets the value of the parent folder ID to the folder ID for the parent folder specified by the user earlier. A naming operation 906 then prompts the user to enter a name for the folder. A verification operation 907 verifies whether the folder name entered by the user is valid. If the folder name is valid, the folder store stores the folder data structure in the folder store. The name-verification operation 907 is described in more detail below.

If the user selects a folder hierarchy other than the default folder hierarchy, a folder ID operation 910 finds the next available folder ID that is greater than 256 using a search technique similar to that outlined above and sets the value of the folder ID to the requested value that the search failed to find in the folder database 422. The parent ID operation 911 then sets the value of the parent folder ID for the newly created folder to equal the folder ID of the parent folder specified by the user earlier. If the device is currently connected to the server, corresponding folder is created on the server and its ID is stored as the server folder ID in the newly created folder record. If the device is not currently connected to the server, the corresponding server folder will be created during folder synchronization the next time connection to the server is established. Additionally, a naming operation 912 prompts the user to enter a name for the folder. A verification operation 913 verifies whether the folder name entered by the user is valid. If the folder name is valid, the folder store module 414 stores the folder data structure in the folder database 422.

Figure 10:
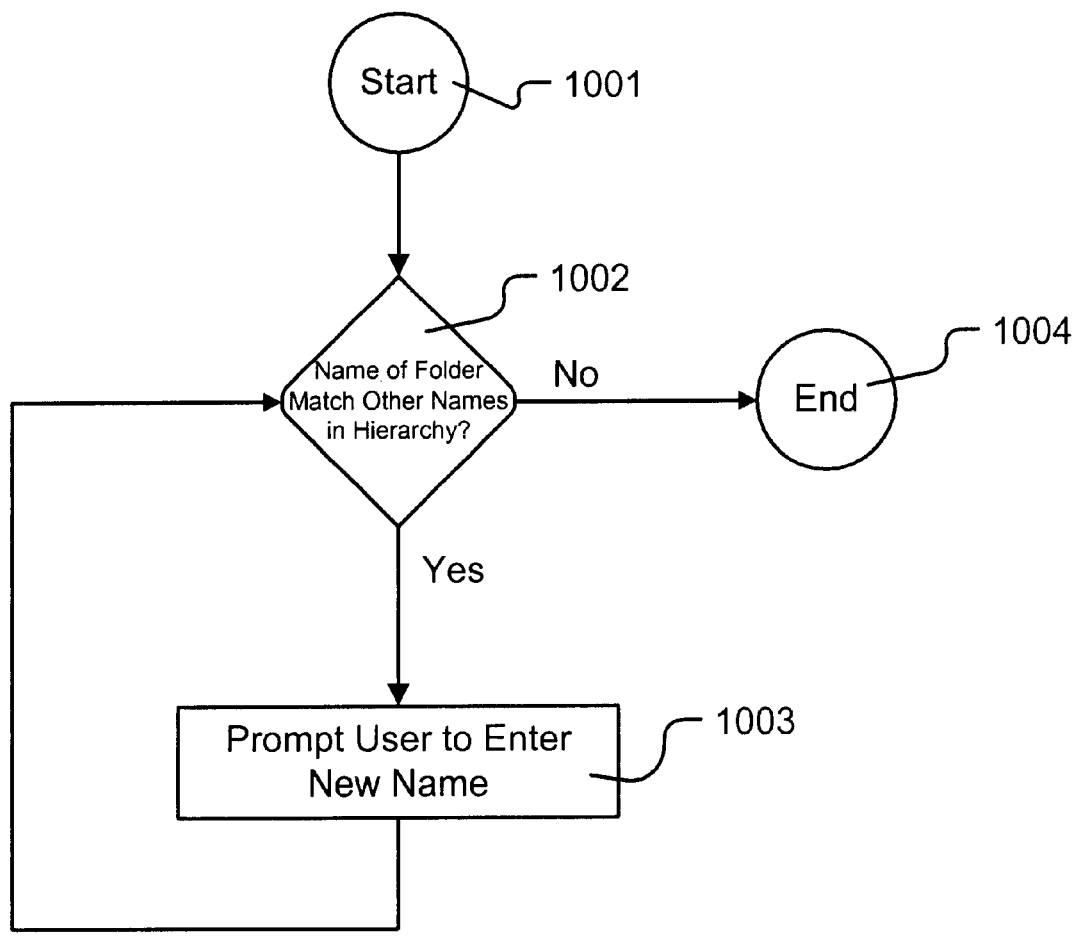
FIG. 10 illustrates a logical operational flow diagram for the processing operations performed by a folder module when verifying a new folder name according to one embodiment of the present invention.

Referring to FIG. 10, the name-verification operation 913 includes several operations itself that verifies whether the user has entered a valid character string in the name field when a new folder is created. When a user creates a new folder within an existing hierarchy, a compare operation 1002 compares the name entered by the user with the names in the folder structure for each of the other subfolders of the new folder's parent folder. If the new name entered by the user matches a name of one of these subfolders, a prompt operation 1003 determines that the name is invalid and prompts the user to enter a new name. After the new name is entered, the compare operation 1002 is re-executed to verify the validity of this new name. In this configuration of the name-verification code, the same name can be used for two folders that have different parent folders, but not for two folders that are subfolders of the same parent folder. This process is also completed when the message store system 400 creates a new folder hierarchy to ensure that the name assigned to the root folder in the folder hierarchy is not the same as the name of a root folder of another hierarchy.

Figure 11:
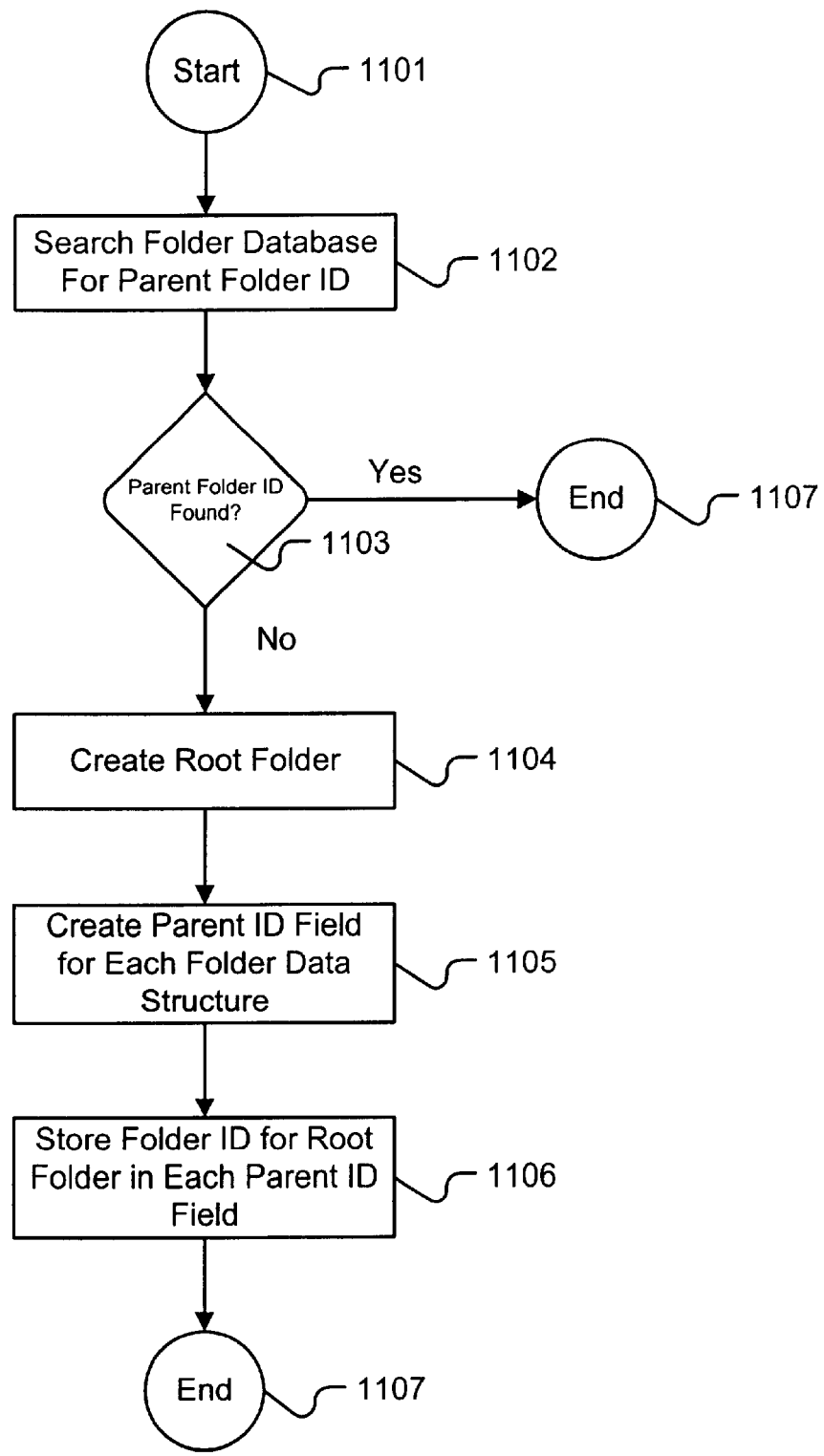
FIG. 11 illustrates a logical operational flow diagram for the processing operations performed by a message store system when updating message and folder databases according to one embodiment of the present invention.

Referring to FIG. 11, the folder store module 414 (FIG. 4) also includes upgrade code that is executed when a user initially upgrades the program on the hand-held computer to utilize a hierarchical folder structure. When the upgrade code is executed, a verification operation 1102 searches the folder database for parent folder ID's. If no parent folder ID's are found, the verification operation 1102 determines, that none of the folder structures for the stored folders contain a parent folder ID field, and thus only a flat folder structure currently exist in the folder database. In other words, the verification operation determines that the folder database is an older version of the message store database and thus none of the folders in the folder database is assigned to a parent folder.

Operations 1104 and 1105 then creates a root folder and modifies the data structure, respectively, for each of the folders to add a field for a parent ID. Another operation 1106 stores the folder ID for the newly created root directory in the parent ID field for each of the folders that was preexisting in the database being upgraded. In one possible embodiment, the newly created root directory is the root directory for the default folder hierarchy.

An example of these operations can be illustrated using the folders shown in FIG. 5. Suppose a user subscribes to a first e-mail service. The root folder ID for the first non-default folder hierarchy is a binary 256. The Inbox, Outbox, and Sent folders have folder ID's equal to 257, 258, and 259, respectively. Now suppose, the user subscribes to a second messaging service. A folder hierarchy for this second messaging service will have a root folder with a folder ID of 260. The second folder hierarchy will also include an Inbox folder, Outbox folder, and Sent folder having folder ID's equal to 261, 262, and 263, respectively.

If the user next defines a first user defined folder in the first folder hierarchy, it is assigned a folder ID of 264 and has a parent folder ID of 256. If the user next defines a second user defined folder in the second folder hierarchy, it is assigned a folder ID of 265 and has a parent folder ID of 260. If the user next defines a first subfolder of the first user defined folder, it is assigned a folder ID of 266 and a parent folder ID of 264. Similarly, if the user defines a second subfolder of the first user defined folder, it is assigned a folder ID of 267 and a parent folder ID of 264.

In use, new messages are delivered to the message store system 400 in the hand-held computer 22 during the synchronization process. During this procedure, the data manipulation module 408 identifies the set of folders that corresponds to the service for which the connection is being established. This set of folders includes the Inbox folder and any other folder associated with that service and requiring synchronization with the server. The data manipulation module 408 then goes through the folders within that set of folders in an iterative process and synchronizes the messages between folders on the hand-held PC 22 and the server 24. Any new messages that are delivered to the device as a result of this procedure have their folder ID field set to the ID of the folder they were delivered into.

Messaging applications 402 executing within a hand-held computer interact with the message and folder databases 420 and 422 through the use of APIs to manipulate, store, and retrieve electronic messages in the hand-held computer. These APIs comprise a set of functional routines used by a program to direct the performance of procedures by other modules on a computer. In the embodiment disclosed herein, these APIs relate to the manipulation and storage of electronic messages on a hand-held computer.

These messaging applications 402 may comprise an electronic mail client process running on the hand-held computer to retrieve e-mail from a remote computer. These applications, through the message store system 400, manage a synchronization process used to update the contents of hand-held computer to match the data stored on a server or a desktop computer. These applications may also comprise client processes relating to voice mail messages, video image messages, and other forms of electronic messages which are retrieved from a remote computer to be stored, manipulated, and retrieved by a user of the hand-held computer.

The messaging application manages the processing functions relating to downloading these messages from a remote computer, storing these messages in the message database, retrieving and displaying these messages for review by the hand-held computer user, deleting these messages from the message database, and maintaining the user-specified, hierarchical folder structure used to hold these messages within the message database. These messaging applications utilize the APIs discussed below to interact with the message store system 400. The APIs provide a set of function calls which allow the application process to store these messages within the message database, to retrieve the messages stored within the message and folder databases 420 and 422, and to manipulate a pointer to the message and folder being accessed as the process traverses the hierarchical folder structure within the message and folder databases 420 and 422, and various system bookkeeping functions.

The APIs also include a set of function calls, which provide backward compatibility to applications developed prior to the set of APIs in the embodiment of the invention. In particular, earlier versions of the message store implemented the folder structure as a flat folder structure having no more than 250 folders. Messaging applications, which were developed to interact with this prior organization of the message store used an earlier set of APIs to interact with the flat folder structure. In order for these particular messaging applications to operate on a hand-held computer which implements the user-specified, hierarchical folder structure and its corresponding APIs, the APIs that are used to interact with the hierarchical folder structure need to include APIs directed to providing backward compatibility with the APIs used to interact with the flat folder architecture. Because of the changes made to the data records and their corresponding data fields in the message and folder databases 420 and 422, as discussed above, the backward compatible APIs need to address the differences in the data transmitted by the application when calling these APIs with the data stored in the message and folder databases 420 and 422. The backward compatible APIs also need to handle these issues in a manner, which is transparent to the application process calling the APIs.

Figure 12:
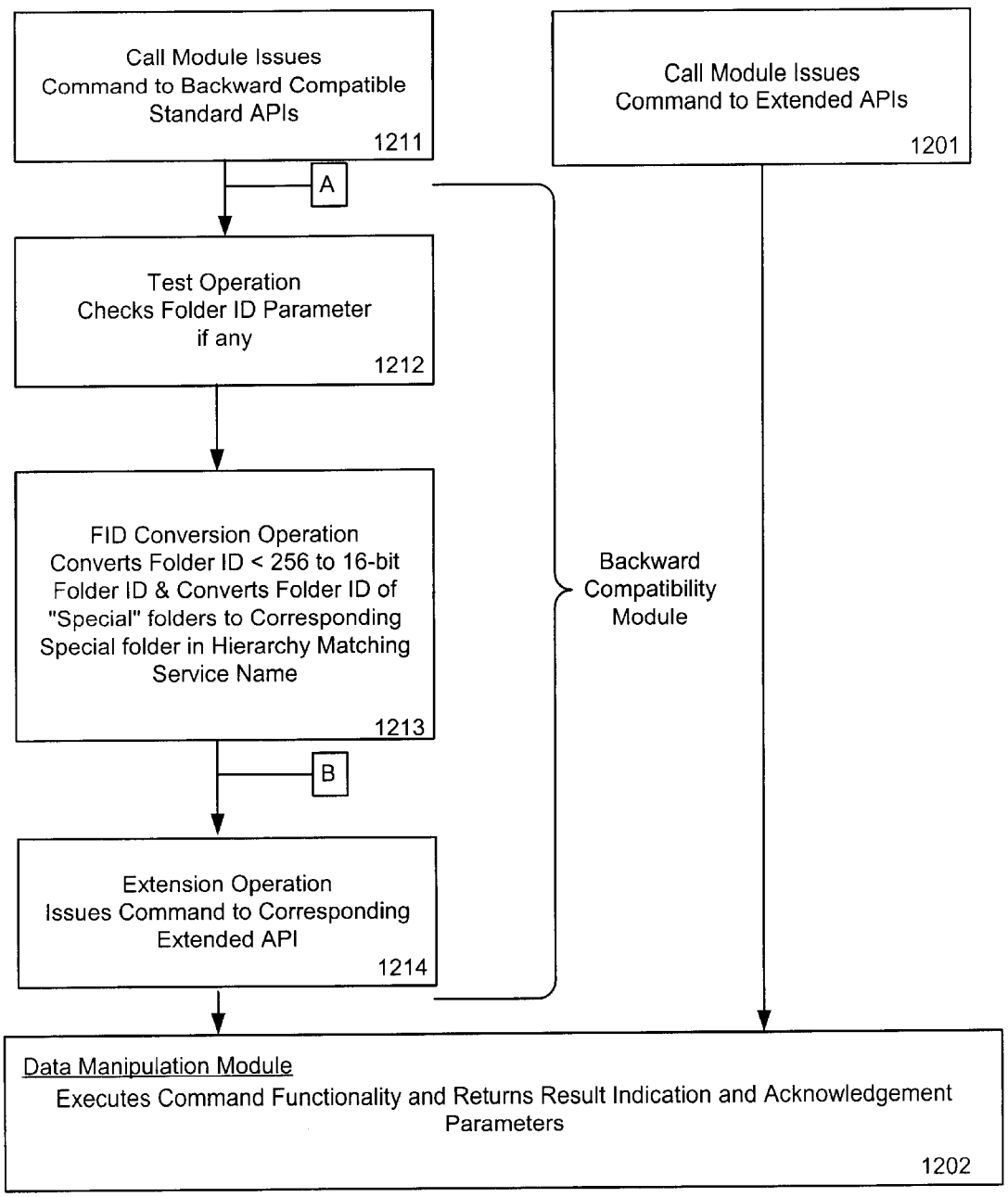
FIG. 12 illustrates a logical operational flow diagram for the processing operations performed by a message store system according to one embodiment of the present invention.

FIG. 12 illustrates a process flow diagram for the functional operations performed when a messaging module issues API commands to a data manipulation module 408. The flow diagram illustrates two parallel operation paths. A first path, operations 1211–1214, is used by API commands to implement a backward compatibility module 410 (FIG. 4) of commands. A second path, operations 1201–1202, is used by all other modules needed to implement the user-defined, hierarchical folder structure within the message and folder databases 420 and 422. The backward compatibility module 410 enables messaging operations developed to interact with earlier versions of the message store to continue to correctly operate using the APIs and message store of the present invention.

In operation 1211, the call module 406 issues a command to one of a standard set of APIs previously used to support the flat folder structure within the message store. A test operation 1212 receives this command and checks to see if a folder ID parameter exists. If this folder ID parameter exists, a FID (folder ID) conversion operation 1213 converts the folder ID to the 16-bit folder ID used by the message store. The FID conversion operation also converts any.special folder ID parameter (i.e. Inbox, Outbox, or Sent folder ID) to the folder ID corresponding to the folder ID of the same special folder within the folder hierarchy identified in the message record.

The extension operation 1214 then issues an extended API command, which is the counterpart to the standard API command and uses the converted parameters in the extended command. Data manipulation module 1202 executes the extended API command. Once the extended command has been completed, the message data manipulation module returns a result indication and any acknowledgment parameters, which are to be returned by module 1202. The result indication may be a Boolean value used to indicate whether module 1202 successfully completed the requested command. With this value, the messaging process may perform error checking and recovery operations. The acknowledgment parameters may include the contents of a message being retrieved or a message and/or folder ID.

The sequence of operations 1211–1214 illustrate the operations performed by the backward compatibility module 410 with the data manipulation module 408 to handle the flat folder architecture that uses a set of standard APIs with the message and folder databases 420 and 422. As discussed above, the flat folder architecture uses an 8-bit value to indicate the folder ID for the message being processed. This parameter imposed a limit of 256 folders, including the special folders of Inbox, Outbox, and Sent. Because the user-specified, hierarchical folder structure uses a 16-bit field for the folder ID in order to allow many more folders to be present in the message and folder databases, the backward compatible module 410 must check this folder ID parameter to determine if the folder ID is less than 256. If it is less than 256, the FID conversion operation 1213 assumes that the messaging application is interacting with the default hierarchy and creates a 16-bit version of the folder ID parameter before issuing a command to the corresponding extended API which implements the functionality of the called standard API. The backward compatibility module 410 also must convert the folder IDs corresponding to a special folder, i.e. Inbox, Outbox, and Sent, to the folder ID corresponding to the service from which the message is downloaded.

As discussed above, the message store system 400 maintains a separate hierarchy for each message service. Within each hierarchy, the special folders corresponding to that service are maintained. In these API commands, the backward compatibility module 410 obtains the service name from the message being processed which is to be stored within a special folder. Using the service name, the backward compatibility module 410 working with the data manipulation module 408 locates the folder ID for the corresponding special folder in the hierarchy matching the service name. The backward compatibility module 410 uses this folder ID as the converted folder ID when issuing the command to the extended API command. The data manipulation module 408 is also responsible for creating parameters required by the extended version of the API which is not present in the calling standard API. These created parameters are given default values used by the default hierarchy.

Because these converted parameters are used when this extended API command is called by the backward compatibility module 410 in operation 1214, the resulting functionality performed by the extended API results in the performance of the functionality of the corresponding standard API interacting with a flat folder structure. The APIs present in the backward compatibility module therefore permit messaging processes developed to interact with the earlier versions of the message store to continue to operate correctly. All of the operations within the backward compatibility module remain transparent to the messaging process as the process only accesses the message store using these API commands.

When using API commands in the new hierarchical folder structure, the messaging application calls desired API command in operation 1201. The messaging module 1201 provides all of the needed parameters to interact with the user-defined, hierarchical message and folder databases 420 and 422. As such, no conversion operation is necessary. The appropriate module within the data manipulation module 408 will execute the desired functionality in operation 1202. Operation 1202 returns a command acknowledgment and any acknowledgment parameters, which are to be returned after execution of the command. The command acknowledgment may be a Boolean value used to indicate whether the requested command was successfully completed. With this value, the message module 412 again may perform error checking and recovery operations. The acknowledgment parameters may comprise the contents of a message being retrieved or a message and/or folder ID as the calling module traverses the folder structure in the message and folder databases 420 and 422.

Figure 13:
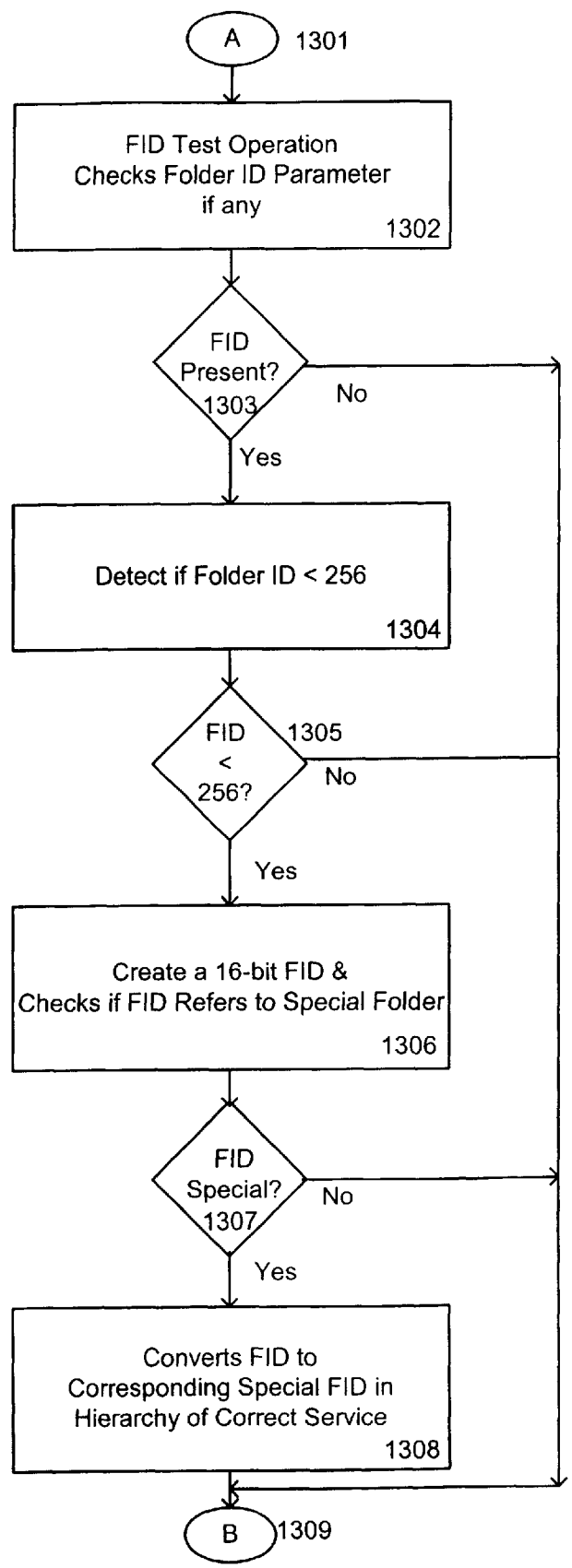
FIG. 13 illustrates a logical operational flow diagram for the processing operations performed by a backward compatibility module according to one embodiment of the present invention.

FIG. 13 illustrates a detailed process flow diagram for the functional operations performed when the backward compatibility module 410 performs the parameter conversion operations 1212 and 1213 (FIG. 12). The conversion process begins when a FID test operation 1302 checks for the presence of a folder ID parameter. In decision operation 1303, the operational flow branches to B 1309 (extension operation 1214) if a folder ID is not present. If a folder ID is present, operation 1304 checks if the folder ID is less than 256. If the folder ID is not less than 256, decision operation 1305 branches to B 1309 (extension operation 1214). If the folder ID is less than 256, a create operation 1306 creates a new 16-bit folder ID for the folder. Operation 1306 also checks if the original folder ID corresponds to a special folder ID. Decision operation 1307 branches the operation flow to B 1309 if the folder ID is not a special folder; otherwise the operational flow sequences to operation 1308.

Special FID operation 1308 converts the folder ID for the special folder to the folder ID corresponding to the appropriate special folder in the hierarchy of the service identified by the service name. Once the parameter conversion operations are complete, extension module 1214 issues an extended API command to the appropriate extended API using the converted parameters to obtain performance of the desired functionality.

A representative example of the parameter conversion process performed by the backward compatibility module 410 can be illustrated using a MailPut( ) call. The messaging application 402 will issue a MailPut( ) API command to the Message Store system to store a message within the message database 420. The backward compatibility module 410 will convert the parameters and issue the extended API command. The message data manipulation module will perform the extended API command. The MailPut( ) command utilizes a MailMsg structure as a parameter. Within the MailMsg structure, the folder in which the message is to be stored is indicated using an 8-bit folder ID. These bits are located within a set of reserved bits of the dwFlags field.

The backward compatibility module 410 converts the 8-bit folder ID to a useable 16-bit folder ID before issuing a MailPutEx( ) API command. For most folders, the 8-bit folder ID value will be moved into the 16-bit converted folder ID-used when calling MailPutEx. If the 8-bit-folder ID corresponds to the folder ID of the Inbox, Outbox, or Sent folder, the module locates the hierarchy for the service, which owns this message. The module next determines the folder ID for the desired special folder in this hierarchy. The module completes the conversion process by using this folder ID as the converted folder ID when calling the MailPutEx( ) command. The MailPutEx( ) command verifies the converted folder ID and performs the message store operation in the same manner as the MailPut( ) command previously did when interacting with the earlier flat folder structure.

The data manipulation module 400 works with a backward compatibility module 410 to provide programs developed for use on hand-held computers implementing a flat folder structure access to data items in the message and folder databases 420 and 422 of a hand-held computer containing a user-specified, hierarchical folder structure.

BACKWARD COMPATIBILITY MODULE

The backward compatibility module 410 operates on a set of APIs having the same name, the same input parameters, and the same acknowledgment parameters as the APIs supported on hand-held computers implementing the flat folder structure. Each of these API commands is listed below.

MailPutFolder API Command

The MailPutFolder API command creates, renames, and deletes a folder from the default hierarchy within the message and folder databases 420 and 422. The folder matching the folder ID will be deleted if the folder name parameter is set to NULL. If the folder ID is in use by a folder having a name, the command renames the folder to the new name if not NULL. The API command returns a Boolean value indicating the success or failure of the command operation.

```
BOOL   MailPutFolder(              // Set new folder name
       HANDLE         hMail,       // Current mail context
```

-continued

```
BYTE      bID,        // Folder ID
LPWSTR    szName);    // Name to set (NULL = DELETE)
```

MailGetFolderName API Command

The MailGetFolderName API command retrieves the folder name for the folder having the folder ID provided with the command. The API command returns the next folder ID still in use in the default hierarchy. The API command will return a −1 for the next used folder ID if the folder ID provided to the command is the last folder. The API command also returns a Boolean value indicating the success or failure of the command operation.

```
BOOL   MailGetFolderName(  // Get folder name
       HANDLE   hMail,     // Current mail context
       int*     piID,      // In=Folder ID, Out=Next used ID or
                           //   −1
       int*     piLen,     // In=buflen Out=needed chrs with
                           //   terminator
       LPWSTR   szName);   // Buffer to fill (NULL=get length)
```

MailGetFolderID API Command

The MailGetFolderID command retrieves the folder ID for the folder having a name matching the folder name provided with the command. The API command returns a Boolean value indicating the success or failure of the command operation.

```
BOOL   MailGetFolderId(     // Get folder ID
       HANDLE   hMail,      // Current mail context
       BYTE*    pbID,       // Folder ID to return
       LPWSTR   szName);    // Name to match
```

MailPut API Command

The MailPut command creates a new message entry in the default hierarchy of the message database 420. The command places the data item into the message database 420 and, if successful, sets the database object identifier (OID) for the message. The mail message parameter is a pointer to a mail message structure. The API command also returns a Boolean value indicating the success or failure of the command operation.

```
BOOL   MailPut(            // Create an new mail entry
       HANDLE   hMail,     // Current mail context
       MailMsg* pmm);      // Item information (dwMsgID ignored)
```

MailGet API Command

The MailGet command retrieves a message from the default hierarchy of the message database 420. The mail message parameter is a pointer to a mail message structure. This mail message structure comprises a database object identifier for the message and flags, MAIL_GET_FLAGS and MAIL_GET_BODY, to instruct the command how much and what part of the message to be retrieved. The API command also returns a Boolean value indicating the success or failure of the command operation.

```
BOOL   MailGet(            // Get a message
       HANDLE   hMail,     // Current mail context
       MailMsg* pmm);      //
```

MailGetSvcID API Command

The MailGetSvcID API command retrieves the database object identifier (OID) of the mail message identified by the server message ID specified in the MailMsg structure. The API command also returns a Boolean value indicating the success or failure of the command operation.

```
BOOL   MailGetSvcId(       
       HANDLE   hMail,     // Current mail context
       MailMsg* pmm);      // Returns pmm->oid and flags
```

MailFirst API Command

The MailFirst API command retrieves the first message of the specified type from the default hierarchy in the message database 420. The command utilizes dwFlags parameter from the MailMsg structure to determine the type of message to be obtained. The API command also returns a Boolean value indicating the success or failure of the command operation.

```
BOOL   MailFirst(          // Get first mail message
       HANDLE   hMail,     // Current mail context
       MailMsg* pmm);      // Mail message to return
```

MailNext API Command

The MailNext API command retrieves the next message of the specified type message from the default hierarchy in the message and folder databases 420 and 422. The command utilizes dwFlags parameter from the MailMsg structure to determine the type of message to be obtained. The command presumes that the command MailFirst has been previously used to obtain the first message. The repeated use of the MailNext command allows the application process to traverse through the messages stored in the default hierarchy. The API command also returns a Boolean value indicating the success or failure of the command operation.

```
BOOL   MailNext(           // Get next mail message
       HANDLE   hMail,     // Current mail context
       MailMsg* pmm);      // Mail message to return (in=prev msg)
```

MailUpdate API Command

The MailUpdate API command replaces an entry within the message database 420 with an object having new information specified by the messaging application. The MailMsg parameter is a pointer to the object having the new information. The API command also returns a Boolean value indicating the success or failure of the command operation.

```
BOOL   MailUpdate(              // Update flags from a previous get
       HANDLE      hMail,       // Current mail context
       MailMsg*    pmm,         // Message with updated flags
       BOOL        fDoAll);     // Update all other fields as well?
```

MailOpenNotify API Command

The MailOpenNotify API command attempts to open a mail database containing the message and folder databases 420 and 422 and specifies a window handle to receive database notification messages. The API command also returns a Boolean value indicating the success or failure of the command operation.

```
BOOL   MailOpenNotify(              // Get mail started
       HANDLE*   phMail,            // Returned handle
       BOOL      fAllowCreate,      // Allow creation of dir and db?
       HWND      hwndNotify);       // HWND for DB notifications
```

SYSTEMS FUNCTION MODULE

The message data manipulation process comprises a systems function module 416 to provide a set of miscellaneous functions necessary to perform system housekeeping and related bookkeeping functions. Each of these API commands is listed below.

MailOpenNotifyEx API Command

The MailOpenNotifyEx API command is similar to MailOpenNotify( ); but it adds the pwVersion parameter so that new code can determine whether it is talking to a new, more-capable database or the older style. (Since this API is not present on devices implementing only a flat folder structure, the command cannot be used on such a device. This command may be used by a desktop-based process, where the process may be trying to figure out the type of hand-held device attached.

```
BOOL   MailOpenNotifyEx(            // Get mail started
       HANDLE*   phMail,            // OUT: Returned handle
       WORD*     pwVersion,         // OUT: Message store version
                                    //     (NULL means "don't care")
       BOOL      fAllowCreate,      // Allow creation of dir and db?
       HWND      hwndNotify);       // Windows handle to receive
                                    //     notifications
```

MailFreeFolderInfo API Command

The MailFreeFolderInfo API command is a new API. In addition to folder IDs and hierarchy information, there is other new data associated with folders, such as whether they have been visited, or synchronized with the mail server. These operations were not necessary when only a single flat folder hierarchy was used. This API allows this information associated with a given folder to be freed. The API command also returns a Boolean value indicating the success or failure of the command operation.

```
BOOL MailFreeFolderInfo(            // Free folder info allocated by
                                    //     MailGetFolderInfo( )
       HANDLE          hMail,       // Current mail context
       MailFolderInfo* pmfi);       // Folder info to be freed
```

MailFreeNotification API Command

The MailFreeNotification API command is a new API. It, however, is related to notification structure changes in the operating system. This API is called to free data provided by the OS to a messaging application as a part of a database notification. The API command also returns a Boolean value indicating the success or failure of the command operation.

```
BOOL MailFreeNotification(          // Free a database notification
                                    //     structure
       HANDLE          hMail,       // Current mail context
       CENOTIFICATION  * pcen;      // Notification structure to be freed
```

RETRIEVE INFO MODULE

The message data manipulation process comprises a retrieve info module 417 to provide a set of information retrieval functions necessary to retrieve data items from the message store 400. Each of these API commands is listed below.

MailGetFolderNameEx API Command

TheMailGetFolderNameEx API command is similar to MailGetFolderName( ), but replaces the flat folder 8-bit folder ID with a new 16-bit folder ID. The API command also returns a Boolean value indicating the success or failure of the command operation.

```
BOOL   MailGetFolderNameEx(   // Replaces MailGetFolderName( )
       HANDLE    hMail,       // Current mail context
       FID*      pfID,        // In=Folder ID, Out=unspecified
       int*      piLen,       // In=buflen Out=no. of chrs with
                              //     terminator
       LPWSTR    sZName);     // Buffer to fill (NULL = get length)
```

MailGetFolderIDEx API Command

The MailGetFolderIDEx API command is similar to MailGetFolderID( ), but replaces the old 8-bit folder ID(pbId) with a new 16-bit folder ID(pfid), so that more than 256 folders are allowed. It also includes a parent folder ID (fidParent), to support the new hierarchical folder stricture. The API command also returns a Boolean value indicating the success or failure of the command operation.

```
BOOL   MailGetFolderIdEx(     // Replaces MailGetFolderId( )
       HANDLE    hMail,       // Current mail context
       FID*      fidParent,   // Parent folder ID
       FID*      pfid,        // Folder ID to return
       LPWSTR    szName);     // Name to match
```

MailGetEx API Command

The MailGetEx API command is similar to MailGet( ), but adds parameters to return a 16-bit folder ID (pfid) and a 16-bit target folder ID (pfidTarget). Both of these were 8-bit values in a flag dword in the old code; but have to be pulled into separate parameters now since 8 bits is not enough for the number of folders supported by the user-specified, hierarchical folder stricture. The API command also returns a Boolean value indicating the success or failure of the command operation.

```
BOOL    MailGetEx(       // Replaces MailGet( )
    HANDLE   hMail,      // Current mail context
    MailMsg* pmm,        //
    FID*     pfid,       //OUT: Message folder ID
    FID*     pfidTarget);// OUT: Target folder ID for Copy/Move
                         (NULL = don't care)
```

MailGetSvcIDEx API Command

The MailGetSvcIDEx API command is similar to MailGetSvcId( ), but adds a parameter to return a 16-bit folder ID (pfid) to indicate which folder the specified mail message is in. The API command also returns a Boolean value indicating the success or failure of the command operation.

```
BOOL    MailGetSvcIdEx(  // Replaces MailGetSvcId
    HANDLE   hMail,      // Current mail context
    MailMsg* pmm,        // Returns pmm->oid and flags
    FID*     pfid);      // OUT: points to ID of message's folder
```

MailUpdateEx API Command

The MailUpdate API command is similar to MailUpdate( ), but adds both a 16-bit folder ID (fid) and a 16-bit target folder ID (fidTarget). Both of these were 8-bit values in a flag dword in the old code; but have to be pulled into separate parameters now since 8 bits is not sufficient for the number of folders supported by the user-specified, hierarchical folder structure. The API command also returns a Boolean value indicating the success or failure of the command operation.

```
BOOL    MailUpdateEx(    // Replaces MailUpdate( )
    HANDLE   hMail,      //Current mail context
    MailMsg* pmm,        // Message with updated flags
    FID      fid,        // Folder ID
                         (MAIL_FOLDER_NONE = don't update)
    FID      fidTarget,  // Target folder ID for Copy/Move
                         (MAIL_FOLDER_NONE = don't update)
    BOOL     fDoAll;     // Update all other fields as well?
```

MailGetFolderInfo API Command

The MailGet FolderInfo API command is a new API. In addition to folder IDs and hierarchy information, there is other data associated with folders, such as whether they have been visited, or synchronized with the mail server (operations that did not make sense in the old message store scheme). This API allows that information to be associated with, and obtained from, a given folder. The API command also returns a Boolean value indicating the success or failure of the command operation.

```
BOOL    MailGetFolderInfo(   // Get folder info
    HANDLE         hMail,    // Current mail context
    FID            fidFolder,// ID of the folder
    MailFolderInfo* pmfi);   // OUT: Folder info
```

MailGetSpecialFolderID API Command

The MailGetSpecialFolderID API command is a new API. In the flat folder structure, "special" folders (like the Inbox, Outbox and Sent folders) were identified by special values. However, the user-specified, hierarchical folder structure comprises multiple hierarchies, so there are multiple special folders. This allows the special folders to be found in a given hierarchy. The API command also returns a Boolean value indicating the success or failure of the command operation.

```
BOOL    MailGetSpecialFolderId(  // Get ID of a special folder
    HANDLE     hMail,            // Current mail context
    FID        fidHierarchy,     // Hierarchy folder ID
    MAILSPFLDR sf,               // Special folder requested
    FID*       pfidFolder);      // OUT: Folder ID
```

MailGetFolderIDFromSvcID API Command

The MailGetFolderIDFromSvcID API command is a new API. It is used to retrieve a server folder ID corresponding to the specified ID on the device. Under the flat folder structure, only the single Inbox folder could be synchronized with a mail server. But now any folder can be synchronized with a mail server, and this API allows server folders to be associated with folders on the device. The API command also returns a Boolean value indicating the success or failure of the command operation.

```
BOOL    MailGetFolderIDFromSvcId(  // Get folder ID from matching
                                   service ID
    HANDLE   hMail,                // Current mail context
    FID      fidParent,            // Parent folder ID
    FID*     pfid,                 // Folder ID to return
    LPWSTR   szServiceID);         // Service ID
```

STORE INFO MODULE

The message data manipulation process comprises a store info function module 418 to provide a set of information storage functions necessary to store data items from the message and folder databases 420 and 422. Each of these API commands is listed below.

MailPutFolderEx API Command

The MailPutFolderEx API command is similar to MailPutFolder( ), but replaces the old 16-bit folder ID (bID) with a 16-bit folder ID (fidFolder) to implement the user-specified, hierarchical folder structure. It also includes a new 16-bit parent folder ID (fidParent) in order to support hierarchical folder structure. The API command also returns a Boolean value indicating the success or failure of the command operation.

```
BOOL    MailPutFolderEx(      / Replaces MailPutFolder( )
    HANDLE   hMail             // Current mail context
    FID*     fidparent,        // Parent ID (MAIL_FOLDER_NONE
                               for no parent;
                               // ignored if szName==NULL)
    FID      fidFolder,        // Folder ID
    LPWSTR   szName);          // Name to set NULL = DELETE)
```

MailPutFolderInfo API Command

The MailPutFolderInfo API command is a new API. In addition to folder IDs and hierarchy information, there is no other data associated with folders, such as whether they have been visited, or synchronized with the mail server. These operations were not necessary when only a flat folder structure is used. This command allows that information to be associated with a given folder. The API command also returns a Boolean value indicating the success or failure of the command operation.

```
BOOL      MailPutFolderInfo(     // Put folder info
    HANDLE         hMail,        // Current mail context
    FID            fidFolder,    // ID of the folder
    MailFolderInfo* pmfi);       // Folder info
```

MailPutEx API Command

The MailPut API command is similar to MailPut( ), but adds a 16-bit folder ID parameter (fid) in order to specify the folder to store the message in. The API command also returns a Boolean value indicating the success or failure of the command operation.

```
BOOL     MailPutEx(         // Replaces MailPut( )
    HANDLE  hMail,          // Current mail context
    MailMsg* pmm,           // Item information (dwMsgID ignored)
    FID     fid);           // Folder ID
```

POINTER MODULE

The message data manipulation process comprises a pointer module 419 to provide a set of information pointer manipulation functions necessary to traverse through the folder structure within the message and folder databases 420 and 422. Each of these API commands is listed below.

MailFirstEx API Command

The MailFirstEx API command is similar to MailFirst( ), but adds parameters to return a 16-bit folder ID (pfid) and a 16-bit target folder ID (pfidTarget). Both of these were 8-bit values in a flag dword in the flat folder implementation of these APIs. In the hierarchical folder implementation these values have to be moved into separate parameters since 8 bits is not sufficient for the number of folders supported by the user-specified, hierarchical folder structure. The API command also returns a Boolean value indicating the success or failure of the command operation.

```
BOOL     MailFirstEx(         // Replaces MailFirst( )
    HANDLE   hMail,           // Current mail context
    MailMsg* pmm,             // Mail message to return
    FID*     pfid,            // IN: Folder to search in
                              (ignored if MAIL_FOLDER_ANY
                              is specified)
                              //OUT: Message folder ID
    FID*     pfidTarget);     // OUT: Target folder ID for
                              Copy/Move
                              (NULL = don't care)
```

MailNextEx API Command

TheMailNextEx API command is similar to MailNext( ), but adds parameters to return a 16-bit folder ID (pfid) and a 16-bit target folder ID (pfidTarget). Both of these were 8-bit values in a flag dword in the flat folder message store implementation; but have to be pulled into separate parameters now since 8 bits is not sufficient for the number of folders supported by the user-specified, hierarchical folder stricture. The API command also returns a Boolean value indicating the success or failure of the command operation.

```
BOOL     MailNextEx(          // Replaces MailNext( )
    HANDLE   hMail,           // Current mail context
    MailMsg* pmm,             // Mail message to return (in=prev msg)
    FID*     pfid,            // IN: Folder to search in
                              (ignored if MAIL_FOLDER_ANY
                              is specified)
                              // OUT: Message folder ID
    FID*     pfidTarget);     // OUT: Target folder ID for Copy/Move
                              (NULL = don't care)
```

MailGetFirstSubFolder API Command

The MailGetFirstSubFolder API command is a new API. In the flat folder structure, folders could be enumerated by simply incrementing a sequential 8-bit folder ID. This API allows enumeration of subfolders of a specified parent folder in the new hierarchical message store. The API command also returns a Boolean value indicating the success or failure of the command operation.

```
BOOL   MailGetFirstSubFolder(   // Get first sub-folder
    HANDLE    hMail,            //Current mail context
    HANDLE*   phIterator,       //OUT: Handle to the folder interior
    FID       fidFolder;        // ID of the folder in which to search
    FID*      pfidSubFolder);   // OUT: Folder ID of the sub-folder
```

MailGetNextSubFolder API Command

The MailGetNextSubFolder API command is a new API. This API is intended to be called after MailGetFirstSubfolder API to continue enumerating through the sub-folders of a specified parent folder in the new hierarchical message store. The API command also returns a Boolean value indicating the success or failure of the command operation.

```
BOOL    MailGetNextSubFolder(  // Get the next folder after the one
                                  specified
                               // (returns FALSE if no more exist)
        HANDLE  hMail,         // Current mail context
        HANDLE  hIterator,     // Handle to the folder iterator
        FID*    pfidSubFolder); // OUT: Folder ID of the next
                                  sub-folder
```

MailFreeIterator API Command

The MailFreeIterator API command is a new API. This command releases the folder iterator data structure, which is used by MailGetFirstSubFolder and MailGetNextSubFolder APIs to traverse the hierarchical folder structure. The API command also returns a Boolean value indicating the success or failure of the command operation.

```
BOOL    MailFreeIterator(
        HANDLE  hMail,         // Current mail context
        HANDLE  hIterator);    // Handle to the iterator to be freed
```

MailGetParent API Command

The MailGetParent API command is a new API. In the flat folder structure, folders did not have parents as only one flat hierarchy existed. In the user-defined hierarchical folder structure, an application process may need to identify the folder containing the current folder. The API command also returns a Boolean value indicating the success or failure of the command operation.

```
BOOL    MailGetParent(         // Get parent folder
        HANDLE  hMail,         // Current mail context
        FID     fidFolder,     // ID of the folder
        FID*    pfidParent);   // OUT: Folder ID of the parent
```

The various embodiments described above are provided by way of illustration only and should not be construed to limit the invention. Those skilled in the art will readily recognize various modifications and changes that may be made to the present invention without following the example embodiments and applications illustrated and described herein, and without departing from the true spirit and scope of the present invention, which is set forth in the following claims.

The claimed invention is:

1. A method of communicating between an application process executing on a hand-held computer and a data manipulation process executing on the hand-held computer, the method comprising:

issuing, by the application process, one of a plurality of commands corresponding to commands manipulating a flat folder structure having a plurality of call parameters comprising a current message context;

receiving, by the data manipulation process, the one of a plurality of commands issued by the application process and parsing the call to retrieve the call parameters; and issuing, by the data manipulation process, one of a plurality of extended commands corresponding to the one of a plurality of commands received from the application processing having a plurality of call parameters comprising the current message context and an extended folder ID corresponding to a parsed folder ID.

2. The method according to claim 1, wherein the method further comprises:

issuing, by the data manipulation process to the application process, one of a plurality of command acknowledgments having one or more acknowledgment parameters.

3. The method according to claim 2, wherein receiving one of a plurality of commands further comprises:

determining a folder ID parameter from the call parameters if the parsed folder ID parameter is less than 256, convert the folder ID parameter to create the extended folder ID; and if the parsed folder ID parameter is greater than or equal to 256, set the extended folder ID to the folder ID parameter.

4. The method according to claim 3, wherein receiving one of a plurality of commands further comprises:

determining if the parsed folder ID parameter contains a special folder ID; and if the parsed folder ID contains a special folder ID, determine a service name for the current message, determine the folder ID for the corresponding special folder within a hierarchy corresponding to that service name, and set the extended folder ID to the folder ID for the corresponding special folder within a hierarchy corresponding to that service name.

5. The method according to claim 4, wherein the one of a plurality of commands issued by the application process comprises a MailPutFolder command having call parameters comprising the current message context, a folder ID, and a folder name, and having acknowledge parameters comprising a result code;

the extended command corresponding to the MailPutFolder command is a MailPutFolderEx command having call parameters comprising the current message context, the extended folder ID, an extended parent folder ID, and a folder name size, and having acknowledge parameters comprising a result code.

6. The method according to claim 4, wherein the one of a plurality of commands issued by the application process comprises a MailGetFolderName command having call parameters comprising the current message context, a folder ID, and a buffer length and having acknowledge parameters comprising a result code, a next used folder ID, and a folder identifier comprising either a folder name or a length of a buffer required to hold the folder name in question;

the extended command corresponding to the MailGetFolderName command is a MailGetFolderNameEx command having call parameters comprising the current message context, the extended folder ID and a buffer length, and having acknowledge parameters comprising a result code and a folder identifier comprising either a folder name or a length of a buffer required to hold the folder name in question.

7. The method according to claim 4, wherein the one of a plurality of commands issued by the application process comprises a MailGetFolderId command having call parameters comprising the current message context and a folder name, and having acknowledge parameters comprising a result code and a folder ID;

the extended command corresponding to the MailGetFolderId command is a MailGetFolderIdEx command having call parameters comprising the current message context, the extended folder ID, an extended parent folder ID, and a folder name, and having acknowledge parameters comprising a result code and a folder ID.

8. The method according to claim 4, wherein
the one of a plurality of commands issued by the application process comprises a MailPut command having call parameters comprising the current message context and a mail message, and having acknowledge parameters comprising a result code;
the extended command corresponding to the MailPut command is a MailPutEx command having call parameters comprising the current message context, the extended folder ID, and the mail message, and having acknowledge parameters comprising a result code.

9. The method according to claim 4, wherein
the one of a plurality of commands issued by the application process comprises a MailGet command having call parameters comprising the current message context and mail message database ID, and acknowledge parameters comprising a result code and a mail message;
the extended command corresponding to the MailGet command is a MailGetEx command having call parameters comprising the current message context and a mail message database ID, and having acknowledge parameters comprising a mail message, an extended folder ID, and an extended target folder ID.

10. The method according to claim 4, wherein
the one of a plurality of commands issued by the application process comprises a MailGetSvcId command having call parameters comprising the current message context, a server message ID, and a service name, and acknowledge parameters comprising a result code, a mail message database ID, and mail message flags;
the extended command corresponding to the MailGetSvcId command is a MailGetSvcIdEx command having call parameters comprising the current message context, a server message ID, and a service name, and having acknowledge parameters comprising a result code, a mail message database ID, a mail message database ID, and extended folder ID.

11. The method according to claim 4, wherein
the one of a plurality of commands issued by the application process comprises a MailFirst command having call parameters comprising the current message context and mail message flags, and acknowledge parameters comprising a result code and a mail message;
the extended command corresponding to the MailFirst command is a MailFirstEx command having call parameters comprising the current message context and mail message flags, and having acknowledge parameters comprising a result code, a mail message, an extended folder ID and an extended target folder ID.

12. The method according to claim 4, wherein
the one of a plurality of commands issued by the application process comprises a MailNext command having call parameters comprising the current message context, and having acknowledge parameters comprising a result code and a mail message;
the extended command corresponding to the MailNext command is a MailNextEx command having call parameters comprising the current message context, and having acknowledge parameters comprising a result code, a mail message, an extended folder ID and an extended target folder ID.

13. The method according to claim 4, wherein
the one of a plurality of commands issued by the application process comprises a MailUpdate command having call parameters comprising the current message context, a mail message, and update all fields indicator, and having acknowledge parameters comprising a result code;
the extended command corresponding to the MailUpdate command is a MailUpdateEx command having call parameters comprising the current message context, the extended folder ID, an extended target folder ID, the mail message, and an update all fields indicator and having acknowledge parameters comprising a result code.

14. The method according to claim 2, wherein
the one of a plurality of commands issued by the application process comprises a MailOpenNotify command having call parameters comprising an allow directory/database creation indicator and a handle to receive notifications, and having acknowledge parameters comprising a result code and the current message context;
the extended command corresponding to the MailOpenNotify command is a MailOpenNotifyEx command having call parameters comprising an allow directory/database creation indicator and a handle to receive notifications, and having acknowledge parameters comprising a result code and the current message context.

15. A computer-readable medium having computer-executable instructions for the method recited in claim 4.

16. A computer data signal embodied in a carrier wave readable by a computing system and encoding a computer program of instructions for executing a computer process performing the method recited in claim 4.

17. A method of communicating between an application process executing on a hand-held computer and an data manipulation process executing on the hand-held computer, the method comprising:
issuing, by the application process, one of a plurality of commands corresponding to commands manipulating a user-specified, hierarchical folder structure for use in storing electronic messages in a hand-held computer, the commands having a plurality of call parameters comprising a current message context;
receiving, by the data manipulation process, the one of a plurality of commands issued by the application.process and parsing the call to retrieve the call parameters; and
issuing, by the data manipulation process to the application process, one of a plurality of command acknowledgments having one or more acknowledgment parameters.

18. The method according to claim 17, wherein the one of a plurality of commands issued by the application process comprises a MailPutFolderEx command having call parameters comprising the current message context, the extended folder ID, an extended parent folder ID, and a folder name size, and having acknowledge parameters comprising a result code.

19. The method according to claim 17, wherein the one of a plurality of commands issued by the application process comprises a MailGetFolderNameEx command having call parameters comprising the current message context, the extended folder ID and a buffer length, and having acknowledge parameters comprising a result code and a folder identifier comprising either a folder name or a length of a buffer required to hold the folder name in question.

20. The method according to claim 17, wherein the one of a plurality of commands issued by the application process comprises a MailGetFolderIdEx command having call parameters comprising the current message context, the extended folder ID, an extended parent folder ID, and a folder name, and having acknowledge parameters comprising a result code and a folder ID.

21. The method according to claim 17, wherein the one of a plurality of commands issued by the application process comprises a MailPutEx command having call parameters comprising the current message context, the extended folder ID, and the mail message, and having acknowledge parameters comprising a result code.

22. The method according to claim 17, wherein the one of a plurality of commands issued by the application process comprises a MailGetEx command having call parameters comprising the current message context and a mail message database ID, and having acknowledge parameters comprising a mail message, an extended folder ID, and an extended target folder ID.

23. The method according to claim 17, wherein the one of a plurality of commands issued by the application process comprises a MailGetSvcIdEx command having call parameters comprising the current message context, a server message ID, and a service name, and having acknowledge parameters comprising a result code, a mail message database ID, and extended folder ID.

24. The method according to claim 17, wherein the one of a plurality of commands issued by the application process comprises a MailFirstEx command having call parameters comprising the current message context and mail message flags, and having acknowledge parameters comprising a result code, a mail message, an extended folder ID and an extended target folder ID.

25. The method according to claim 17, wherein the one of a plurality of commands issued by the application process comprises a MailNextEx command having call parameters comprising the current message context, and having acknowledge parameters comprising a result code, a mail message, an extended folder ID and an extended target folder ID.

26. The method according to claim 17, wherein the one of a plurality of commands issued by the application process comprises a MailUpdateEx command having call parameters comprising the current message context, the extended folder ID, an extended target folder ID, the mail message, and an update all fields indicator and having acknowledge parameters comprising a result code.

27. The method according to claim 17, wherein the one of a plurality of commands issued by the application process comprises a MailOpenNotifyEx command having call parameters comprising an allow directory/database creation indicator and a handle to receive notifications, and having acknowledge parameters comprising a result code and the current message context.

28. The method according to claim 17, wherein the one of a plurality of commands issued by the application process comprises a MailGetFirstSubFolder command having call parameters comprising the current message context and a folder ID, and having acknowledge parameters comprising a result code, a handle to a folder iterator, and a subfolder ID.

29. A method according to claim 17, wherein the one of a plurality of commands issued by the application process comprises a MailGetNextSubFolder command having call parameters comprising the current message context and a handle to a folder iterator, and having acknowledge parameters comprising a result code and a subfolder ID.

30. A method according to claim 17, wherein the one of a plurality of commands issued by the application process comprises a MailFreeIterator command having call parameters comprising the current message context and a handle to a folder iterator to be freed, and having acknowledge parameters comprising a result code.

31. A method according to claim 17, wherein the one of a plurality of commands issued by the application process comprises a MailGetParent command having call parameters comprising the current message context, and a folder ID, and having acknowledge parameters comprising a result code and a parent folder ID.

32. A method according to claim 17, wherein the one of a plurality of commands issued by the application process comprises a MailPutFolderInfo command having call parameters comprising the current message context, a folder ID, and a folder info data item, and having acknowledge parameters comprising a result code.

33. A method according to claim 17, wherein the one of a plurality of commands issued by the application process comprises a MailGetFolderInfo command having call parameters comprising the current message context and a folder ID, and having acknowledge parameters comprising a result code and a folder info data item.

34. A method according to claim 17, wherein the one of a plurality of commands issued by the application process comprises a MailFreeFolderInfo command having call parameters comprising the current message context and folder info data item to be freed, and having acknowledge parameters comprising a result code.

35. A method according to claim 17, wherein the one of a plurality of commands issued by the application process comprises a MailGetSpecialFolderId command having call parameters comprising the current message context, a hierarchy folder ID, and an identify of the requested special folder, and having acknowledge parameters comprising a result code and a special folder.

36. A method according to claim 17, wherein the one of a plurality of commands issued by the application process comprises a MailGetFolderIDFromSvcId command having call parameters comprising the current message context, a parent folder ID, and a service folder ID, and having acknowledge parameters comprising a result code and a folder ID.

37. A method according to claim 17, wherein the one of a plurality of commands issued by the application process comprises a MailFreeNotification command having call parameters comprising the current message context and a notification structure to be freed, and having acknowledge parameters comprising a result code.

38. A computer-readable medium having computer-executable instructions for the method recited in claim 17.

39. A computer data signal embodied in a carrier wave readable by a computing system and encoding a computer program of instructions for executing a computer process performing the method recited in claim 17.

40. An apparatus for manipulating and storing electronic messages received from a remote computer within a data store, the apparatus operating an messaging module within a hand-held computer, and said apparatus comprising:
   a backward compatibility module executing standard commands being issued by the messaging module and having a plurality of parameter in a standard format, the backward compatibility module executes commands by converting the plurality of parameters from the standard format to an extended format and issuing a call to an extended command corresponding to the standard command being executed;

a message data manipulation module executing extended commands having a plurality of parameter in the extended comprising a current message context, a folder ID, and a extended folder ID corresponding to a parced folder ID, the message data manipulation module performs the functions of storing, manipulating, and retrieving messages in the data store.

41. The apparatus according to claim 40, wherein the backward compatibility module converts the plurality of parameters from the standard format to an extended format by:

determining the folder ID parameter from the call parameters;

if the parsed folder ID parameter is less than 256, convert the folder ID parameter to create the extended folder ID;

if the parsed folder ID parameter is greater than or equal to 256, set the extended folder ID to the folder ID parameter;

determining if the parsed folder ID parameter contains a special folder ID; and if the parsed folder ID contains a special folder ID, determine a service name for the current message, determine the folder ID for the corresponding special folder within a hierarchy corresponding service name, and set the extended folder ID to the folder ID of the folder ID for the corresponding special folder within a hierarchy corresponding service name.

42. The apparatus according to claim 41, wherein the message data manipulation module further comprises:

a systems function module executing systems commands being issued by the messaging module requesting system administration functions be performed;

a retrieve info module executing retrieval commands issued by the messaging module requesting data items be retrieved from the data store;

a store info module executing store commands issued by the messaging module requesting data items be stored in the data store; and a pointer module executing pointer commands issued by the messaging module requesting:

a folder pointer indicating a folder ID for a current folder being accessed; and a message pointer indicating a message ID for a current message being accessed.

43. The apparatus according to claim 40, wherein the standard commands executed by the backward compatibility module comprise a MailPutFolder command having call parameters comprising the current message context, a folder ID, and a name, the extended command corresponding to the MailPutFolder command is a MailPutFolderEx command having call parameters comprising the current message context, the extended folder ID, an extended parent folder ID, and a folder name size, and having acknowledge parameters comprising a result code.

44. The apparatus according to claim 40, wherein the standard commands executed by the backward compatibility module comprise a MailGetFolderName command having call parameters comprising the current message context, a folder ID, a buffer length, and a namesize and having acknowledge parameters comprising a next used folderID and a number of characters with termination, the extended command corresponding to the MailGet FolderName command is a MailGetFolderNameEx command having call parameters comprising the current message context, the extended folder ID and a buffer length, and having acknowledge parameters comprising a result code and a folder identifier comprising either a folder name or a length of a buffer required to hold the folder name in question.

45. The apparatus according to claim 40, wherein the standard commands executed by the backward compatibility module comprise a MailGetFolderID command having call parameters comprising the current message context, a parent folder ID, and a folder name to match and having acknowledge parameters comprising a folderID, the extended command corresponding to the MailGet FolderID command is MailGetFolderIdEx command having call parameters comprising the current message context, the extended folder ID, an extended parent folder ID, and a folder name, and having acknowledge parameters comprising a result code and a folder ID.

46. The apparatus according to claim 40, wherein the standard commands executed by the backward compatibility module comprise a MailPut command having call parameters comprising the current message context and a data item, the extended command corresponding to the MailPut command is a MailPutEx command having call parameters comprising the current message context, the extended folder ID, and the mail message, and having acknowledge parameters comprising a result code.

47. The apparatus according to claim 40, wherein the standard commands executed by the backward compatibility module comprise a MailGet command having call parameters comprising the current message context and a message data item, the extended command corresponding to the MailGet command is a MailGetEx command having call parameters comprising the current message context and a mail message database ID, and having acknowledge parameters comprising a mail message, an extended folder ID, and an extended target folder ID.

48. The apparatus according to claim 40, wherein the standard commands executed by the backward compatibility module comprise a MailGetSvcID command having call parameters comprising the current message, a server message ID, and a service name, the extended command corresponding to the MailGetSvcID command is a MailGetSvcIdEx command having call parameters comprising the current message context, a server message ID, and a service name, and having acknowledge parameters comprising a result code, a mail message database ID, and extended folder ID.

49. The apparatus according to claim 40, wherein the standard commands executed by the backward compatibility module comprise a MailFirst command having call parameters comprising the current message context and a message data item, the extended command corresponding to the MailFirst command is a MailFirstEx command having call parameters comprising the current message context and mail message flags, and having acknowledge parameters comprising a result code, a mail message, an extended folder ID and an extended target folder ID.

50. The apparatus according to claim 40, wherein the standard commands executed by the backward compatibility module comprise a MailNext command having call parameters comprising the current message context and a message data iten, the extended command corresponding to the MailNext command is a MailNextEx command having call parameters comprising the current message context, and having acknowledge parameters comprising a result code, a mail message, an extended folder ID and an extended target folder ID.

51. The apparatus according to claim 40, wherein the standard commands executed by the backward compatibility module comprise a MailUpdate command having call parameters comprising the current message context, a message data item, and update all fields indicator, the extended command corresponding to the MailUpdate command is a MailUpdateEx command having call parameters comprising the current message context, the extended folder ID, an extended target folder ID, the mail message, and an update all fields indicator and having acknowledge parameters comprising a result code.

52. The apparatus according to claim 40, wherein the standard commands executed by the backward compatibility module comprise a MailOpenNotify command having call parameters comprising an allow director/database creation indicator and a handle to receive notifications and having acknowledge parameters comprising the current message context, the extended command corresponding to the MailOpenNotify command is a MailOpenNotifyEx command having call parameters comprising an allow directory/database creation indicator and a handle to receive notifications, and having acknowledge parameters comprising a result code and the current message context.

53. The apparatus according to claim 41, wherein the systems commands executed by the retrieval module comprise a MailOpenNotifyEx command having call parameters an allow directory/database creation indicator and a handle to receive notifications, and having acknowledge parameters comprising a result code and the current message context.

54. The apparatus according to claim 41, wherein the systems commands executed by the retrieval module comprise a MailFreeFolderInfo command having call parameters comprising the current message context and folder info data item to be freed, and having acknowledge parameters comprising a result code.

55. The apparatus according to claim 41, wherein the systems commands executed by the retrieval module comprise a MailFreeNotification command having call parameters comprising the current message context and a notification structure to be freed, and having acknowledge parameters comprising a result code.

56. The apparatus according to claim 41, wherein the retrieve commands executed by the retrieval module comprise a MailGetFolderNameEx command having call parameters comprising the current message context, the extended folder ID and a buffer length, and having acknowledge parameters comprising a result code and a folder identifier comprising either a folder name or a length of a buffer required to hold the folder name in question.

57. The apparatus according to claim 41, wherein the retrieve commands executed by the retrieval module comprise a MailGetFolderIdEx command having call parameters comprising the current message context, the extended folder ID and a buffer length, and having acknowledge parameters comprising a result code and a folder identifier comprising either a folder name or a length of a buffer required to hold the folder name in question.

58. The apparatus according to claim 41, wherein the retrieve commands executed by the retrieval module comprise a MailGetEx command having call parameters comprising the current message context and a mail message database ID, and having acknowledge parameters comprising a mail message, an extended folder ID, and an extended target folder ID.

59. The apparatus according to claim 41, wherein the retrieve commands executed by the retrieval module comprises a MailGetSvcIdEx command having call parameters comprising the current message context, a server message ID, and a service name, and having acknowledge parameters comprising a result code, a mail message database ID, a mail message database ID, and extended folder ID.

60. The apparatus according to claim 41, wherein the retrieve commands executed by the retrieval module comprise a MailUpdateEx command having call parameters comprising the current message context, the extended folder ID, an extended target folder ID, the mail message, and an update all fields indicator and having acknowledge parameters comprising a result code.

61. The apparatus according to claim 41, wherein the retrieve commands executed by the retrieval module comprise a MailGetFolderInfo command having call parameters comprising the current message context and a folder ID, and having acknowledge parameters comprising a result code and a folder info data item.

62. The apparatus according to claim 41, wherein the retrieve commands executed by the retrieval module comprise a MailGetSpecialFolderId command having call parameters comprising the current message context, a hierarchy folder ID, and an identify of the requested special folder, and having acknowledge parameters comprising a result code and a special folder.

63. The apparatus according to claim 41, wherein the retrieve commands executed by the retrieval module comprise a MailGetFolderIDFromSvcId command having call parameters comprising the current message context, a parent folder ID, and a service folder ID, and having acknowledge parameters comprising a result code and a folder ID.

64. The apparatus according to claim 41, wherein the store commands executed by the store module comprise a MailPutFolderEx command having call parameters comprising the current message context, the extended folder ID, an extended parent folder ID, and a folder name size, and having acknowledge parameters comprising a result code.

65. The apparatus according to claim 41, wherein the store commands executed by the store module comprise comprises a MailPutEx command having call parameters comprising the current message context, the extended folder ID, and the mail message, and having acknowledge parameters comprising a result code.

66. The apparatus according to claim 41, wherein the store commands executed by the store module comprise process a MailPutFolderInfo command having call parameters comprising the current message context, a folder ID, and a folder info data item, and having acknowledge parameters comprising a result code.

67. The apparatus according to claim 41, wherein the pointer commands executed by the pointer module comprise a MailFirstEx command having call parameters comprising the current message context and mail message flags, and having acknowledge parameters comprising a result code, a mail message, an extended folder ID and an extended target folder ID.

68. The apparatus according to claim 41, wherein the pointer commands executed by the pointer module comprise a MailNextEx command having call parameters comprising the current message context, and having acknowledge parameters comprising a result code, a mail message, an extended folder ID and an extended target folder ID.

69. The apparatus according to claim 41, wherein the pointer commands executed by the pointer module comprise a MailGetFirstSubFolder command having call parameters comprising the current message context and a folder ID, and having acknowledge parameters comprising a result code, a handle to a folder iterator, and a subfolder ID.

70. The apparatus according to claim 41, wherein the pointer commands executed by the pointer module comprise a MailGetNextSubFolder command having call parameters comprising the current message context and a handle to a folder iterator, and having acknowledge parameters comprising a result code and a subfolder ID.

71. The apparatus according to claim 41, wherein the pointer commands executed by the pointer module comprise a MailFreeIterator command having call parameters comprising the current message context and a handle to a folder iterator to be freed, and having acknowledge parameters comprising a result code.

72. The apparatus according to claim 41, wherein the pointer commands executed by the pointer module comprise a MailGetParent command having call parameters comprising the current message context, and a folder ID, and having acknowledge parameters comprising a parent folder ID.

* * * * *

UNITED STATES PATENT AND TRADEMARK OFFICE
CERTIFICATE OF CORRECTION

PATENT NO. : 6,606,649 B1  Page 1 of 1
DATED : August 12, 2003
INVENTOR(S) : Schwitters et al.

It is certified that error appears in the above-identified patent and that said Letters Patent is hereby corrected as shown below:

Column 14,
Line 25, delete "." after the word "any".

Column 19,
Line 39, delete "(".

Column 26,
Line 13, there should be a line break before the word "if".

Column 28,
Line 47, delete "." after the word "application".

Column 31,
Line 6, insert -- format -- after "extended".

Column 32,
Line 62, delete "iten" and insert -- item --.

Column 33,
Line 5, delete "and" and insert -- an --.

Column 34,
Lines 38-39, delete "comprises".
Line 44, delete "process".

Signed and Sealed this

Second Day of December, 2003

JAMES E. ROGAN
*Director of the United States Patent and Trademark Office*